(12) United States Patent
Atsumi et al.

(10) Patent No.: US 8,593,749 B2
(45) Date of Patent: Nov. 26, 2013

(54) HARD-DISK DRIVE INCLUDING FLY-HEIGHT-ADJUSTMENT HEATING ELEMENT AND POSITION-ADJUSTMENT HEATING ELEMENT AND METHOD OF CONTROLLING FLY HEIGHT

(75) Inventors: Takenori Atsumi, Ibaraki (JP); Irizo Naniwa, Kanagawa (JP); Toshiya Shiramatsu, Kanagawa (JP); Masayuki Kurita, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 672 days.

(21) Appl. No.: 12/635,641

(22) Filed: Dec. 10, 2009

(65) Prior Publication Data

US 2011/0080671 A1 Apr. 7, 2011

(30) Foreign Application Priority Data

Dec. 10, 2008 (JP) ................... 2008-314351

(51) Int. Cl.
*G11B 21/16* (2006.01)
(52) U.S. Cl.
USPC .......................................................... 360/55
(58) Field of Classification Search
USPC .......................................................... 360/55
See application file for complete search history.

(56) References Cited

U.S. PATENT DOCUMENTS

| | | | |
|---|---|---|---|
| 8,009,380 B2* | 8/2011 | Matsushita et al. | 360/75 |
| 8,077,423 B1* | 12/2011 | Rahgozar | 360/75 |
| 8,077,427 B2* | 12/2011 | Mathew et al. | 360/75 |
| 8,094,418 B2* | 1/2012 | Schreck et al. | 360/317 |
| 8,098,450 B2* | 1/2012 | Baumgart et al. | 360/75 |
| 8,125,728 B2* | 2/2012 | Kurita et al. | 360/75 |
| 8,149,541 B2* | 4/2012 | Baumgart et al. | 360/235.4 |
| 8,159,771 B2* | 4/2012 | Cheng et al. | 360/75 |
| 8,169,751 B2* | 5/2012 | Albrecht et al. | 360/323 |
| 8,254,051 B2* | 8/2012 | Kuramoto | 360/75 |
| 8,254,061 B2* | 8/2012 | Kuroki et al. | 360/234.4 |
| 8,259,406 B2* | 9/2012 | Kazusawa et al. | 360/46 |
| 8,259,412 B2* | 9/2012 | Hsiao et al. | 360/125.31 |
| 2004/0027709 A1 | 2/2004 | Hamaguchi et al. | |

FOREIGN PATENT DOCUMENTS

| | | |
|---|---|---|
| JP | 04285775 | 10/1992 |
| JP | 05020635 | 1/1993 |

* cited by examiner

*Primary Examiner* — Mark Blouin

(57) ABSTRACT

A hard-disk drive. The hard-disk drive includes a head-slider configured to fly in proximity with a recording surface of a magnetic-recording disk, and a fly-height variation compensator configured to generate a signal for compensating variation in fly height of a write element of the head-slider. The head-slider further includes the write element configured to write data to the magnetic-recording disk, a fly-height-adjustment heating element configured to displace the write element towards the magnetic-recording disk, and a position-adjustment heating element configured to displace the write element in at least a direction perpendicular to a flying direction. The fly-height variation compensator is further configured to add the signal for compensating variation in fly height to a control signal for output to the fly-height-adjustment heating element.

9 Claims, 20 Drawing Sheets

(a)

(b)

(a)

(b)

(a)

(b)

(a)

(b)

HARD-DISK DRIVE INCLUDING FLY-HEIGHT-ADJUSTMENT HEATING ELEMENT AND POSITION-ADJUSTMENT HEATING ELEMENT AND METHOD OF CONTROLLING FLY HEIGHT

CROSS-REFERENCE TO RELATED APPLICATION

This application claims priority from the Japanese Patent Application No. 2008-314351, filed Dec. 10, 2008, the disclosure of which is incorporated herein in its entirety by reference.

TECHNICAL FIELD

Embodiments of the present invention relate to a hard-disk drive (HDD) including a fly-height-adjustment heating element and a position-adjustment heating element and a method of controlling the fly height.

BACKGROUND

Thermal fly-height control (TFC,) is known in the art, in which a fly-height-adjustment heating element is disposed in a head-slider so that a write element is displaced towards a magnetic-recording disk side by thermal expansion. Engineers and scientists engaged in HDD manufacturing and development are interested in the design of HDDs that control the fly height and variations in the fly height between the write element of the head-slider and the magnetic-recording disk to meet the rising demands of the marketplace for increased data-storage capacity, performance, and reliability.

SUMMARY

Embodiments of the present invention include a hard-disk drive. The hard-disk drive includes a head-slider configured to fly in proximity with a recording surface of a magnetic-recording disk, and a fly-height variation compensator configured to generate a signal for compensating variation in fly height of a write element of the head-slider. The head-slider further includes the write element configured to write data to the magnetic-recording disk, a fly-height-adjustment heating element configured to displace the write element towards the magnetic-recording disk, and a position-adjustment heating element configured to displace the write element in at least a direction perpendicular to a flying direction. The fly-height variation compensator is further configured to add the signal for compensating variation in fly height to a control signal for output to the fly-height-adjustment heating element.

DESCRIPTION OF THE DRAWINGS

The accompanying drawings, which are incorporated in and form a part of this specification, illustrate embodiments of the invention and, together with the description, serve to explain the embodiments of the present invention.

Figure 1:
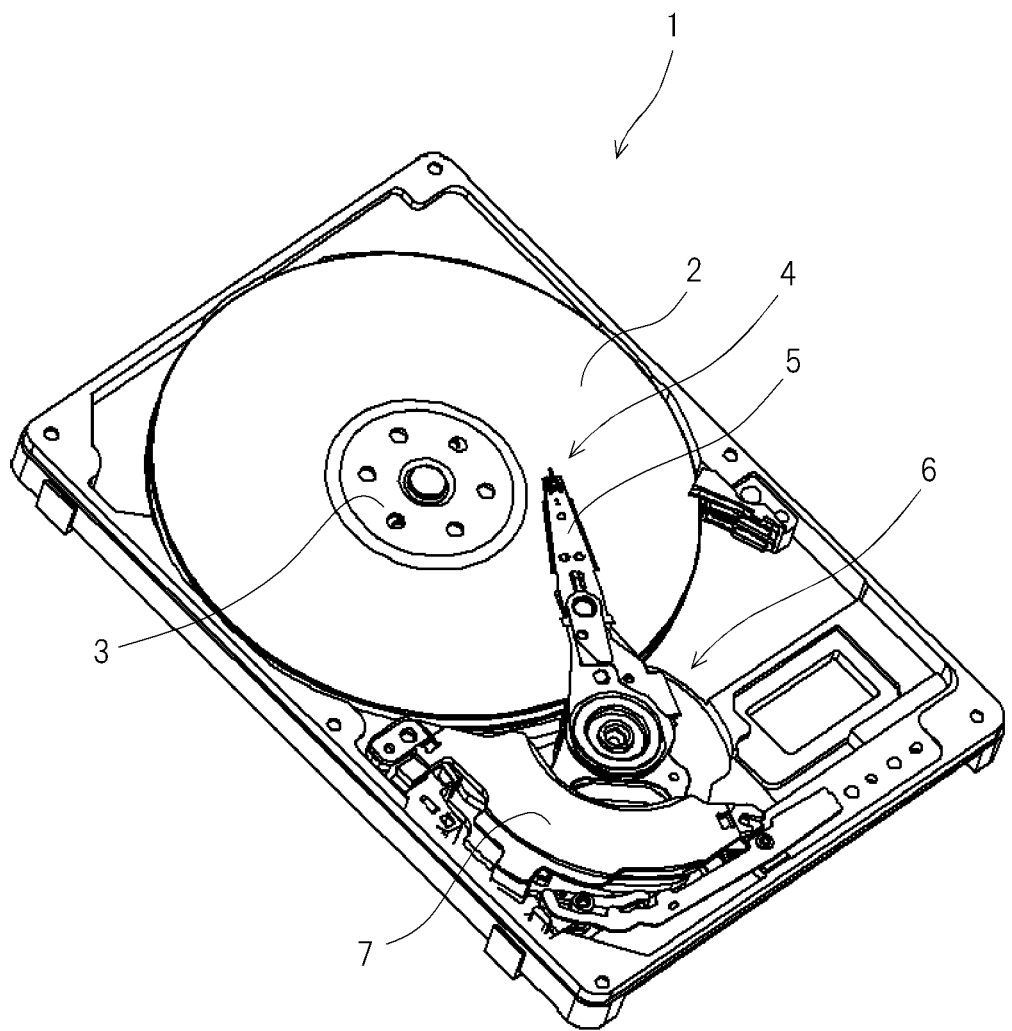
FIG. 1 is a perspective view of an example hard-disk drive (HDD), in accordance with an embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Description of Embodiments of the Present Invention for a Hard-Disk Drive Including a Fly-Height-Adjustment Heating Element and a Position-Adjustment Heating Element and a Method of Controlling Fly Height In accordance with embodiments of the present invention, the inventors have investigated a configuration where a position-adjustment heating element, which displaces a write element in a direction crossing a flying direction, is provided separately from the fly-height-adjustment heating element in the head-slider. However, in such a case, thermal expansion due to the position-adjustment heating element may act even in a flying direction, leading to variation in fly height of the write element. As hard-disk-drive (HDD) technology has advanced, the fly height of a write element has been greatly diminished so that variation in fly height tends to cause collision of the write element with a magnetic-recording disk. Embodiments of the present invention provide a hard-disk drive (HDD) that may suppress variation in fly height of a write element, as well as provide a method of controlling fly height in a HDD.

In accordance with embodiments of the present invention, a HDD includes a head-slider configured to fly in proximity with the recording surface of a magnetic-recording disk, and a fly-height variation compensator configured to generate a signal for compensating variation in fly height of a write element of the head-slider. In accordance with embodiments of the present invention, the head-slider includes the write element configured to write data to the magnetic-recording disk, a fly-height-adjustment heating element configured to displace the write element towards the magnetic-recording disk, and a position-adjustment heating element configured to displace the write element in at least a direction perpendicular to a flying direction. Moreover, in accordance with embodiments of the present invention, the fly-height variation compensator is further configured to add the signal for compensating variation in fly height to a control signal for output to the fly-height-adjustment heating element.

In an embodiment of the present invention, the fly-height variation compensator is configured to generate a signal for compensating the variation in fly height due to heating of the position-adjustment heating element.

In another embodiment of the present invention, the fly-height variation compensator is configured to generate a signal for compensating the variation in fly height based on a control signal for output to the position-adjustment heating element.

In yet another embodiment of the present invention, the HDD may further include: a fly-height variation detector configured to detect the variation in fly height, and configured to output a detection signal; and, a second fly-height variation compensator configured to generate a second signal for compensating the variation in fly height based on the detection signal, and configured to add the second signal to the control signal for output to the fly-height-adjustment heating element.

In another embodiment of the present invention, the HDD further includes a fly-height variation detector configured to detect the variation in fly height, and configured to output a detection signal such that the fly-height variation compensator is configured to generate a signal for compensating the variation in fly height based on the detection signal.

In another embodiment of the present invention, the position-adjustment heating element is disposed away from the write element in at least a width direction of the head-slider.

In another embodiment of the present invention, the position-adjustment heating element is disposed away from the write element in at least a longitudinal direction of the head-slider.

In accordance with yet other embodiments of the present invention, a HDD includes a head-slider configured to fly in proximity with the recording surface of a magnetic-recording disk, and a fly-height variation compensator configured to generate a signal for compensating variation in fly height of a write element of the head-slider. In accordance with embodiments of the present invention, the head-slider includes a fly-height-adjustment heating element that is disposed away from a disk-facing surface that is configured to face a magnetic-recording disk, a write element that is disposed between the disk-facing surface and the fly-height-adjustment heating element and is configured to write data to the magnetic-recording disk, and a position-adjustment heating element that is disposed away from the write element in at least a direction along the disk-facing surface. Moreover, in accordance with embodiments of the present invention, the fly-height variation compensator is further configured to add the signal for compensating variation in fly height to a control signal for output to the fly-height-adjustment heating element.

In accordance with yet other embodiments of the present invention, a method of controlling fly height in a HDD including a head-slider configured to fly in proximity with a recording surface of a magnetic-recording disk includes: generating a signal for compensating variation in fly height of the write element; and, adding the signal to a control signal for output to the fly-height-adjustment heating element of the head-slider. In accordance with embodiments of the present invention, the head-slider includes the write element configured to write data to the magnetic-recording disk, a fly-height-adjustment heating element configured to displace the write element towards the magnetic-recording disk, a position-adjustment heating element configured to displace the write element in at least a direction perpendicular to a flying direction.

In accordance with embodiments of the present invention, a signal for compensating variation in fly height of a write element is generated; and, the signal is added to a control signal for output to a fly-height-adjustment heating element. Thus, in accordance with embodiments of the present invention, the variation in fly height of the write element may be suppressed. Embodiments of the present invention for a HDD and a method of controlling the HDD are subsequently described with reference to drawings.

With reference now to FIG. 1, in accordance with an embodiment of the present invention, a perspective view is shown of a HDD 1. In FIG. 1, HDD 1 is shown with a top cover removed to facilitate the description. A disk enclosure (DE) of HDD 1 accommodates a magnetic-recording disk 2 and a head-arm assembly (HAA) 6. The magnetic-recording disk 2 is mounted on a spindle motor (SPM) 3 disposed on a bottom of the DE. HAA 6 is supported by a pivot shaft in proximity to the recording surface of the magnetic-recording disk 2. A suspension arm 5 is disposed on a fore end side of HAA 6; and, a head-slider 4 is supported at the distal end of the suspension arm. A voice coil motor (VCM) 7 is disposed on a rear end portion of the HAA 6. VCM 7 drives HAA 6 so that the head-slider 4 is moved in an approximately radial direction on the magnetic-recording disk 2.

Figure 2:
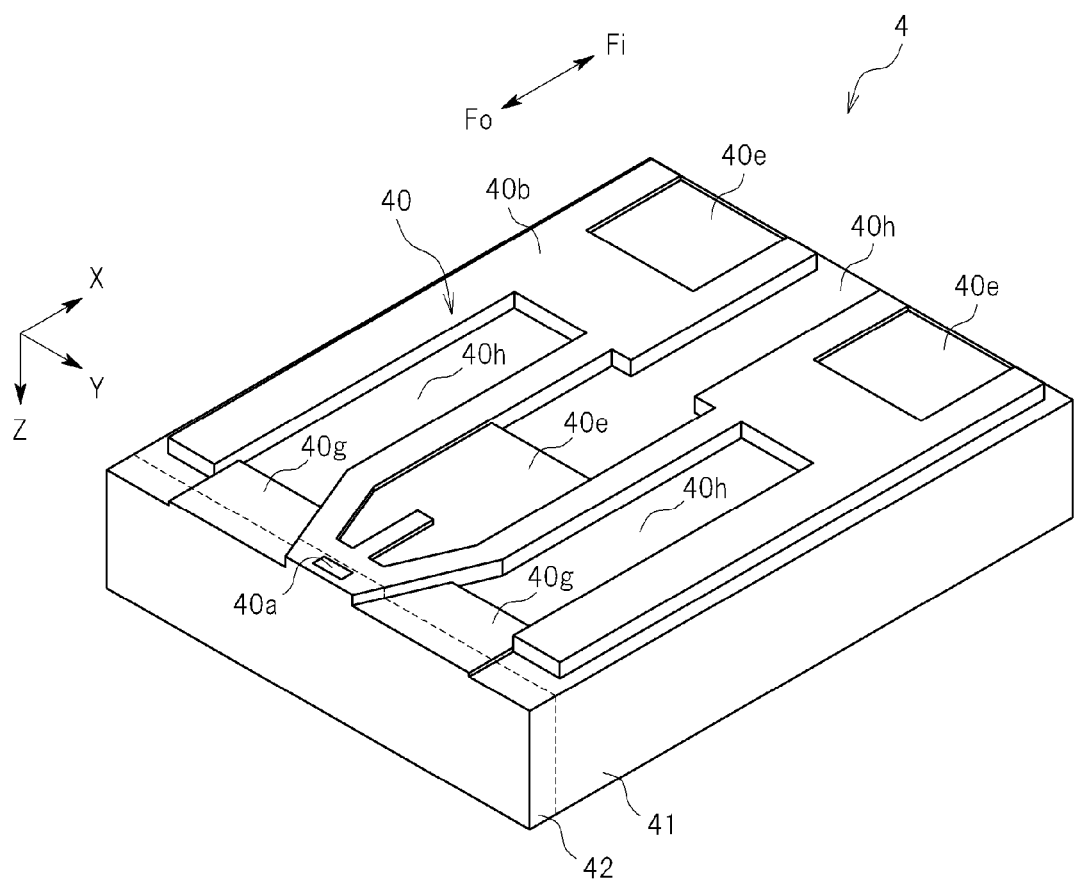
FIG. 2 is a perspective view of an example head-slider, in accordance with an embodiment of the present invention.
Figure 3:
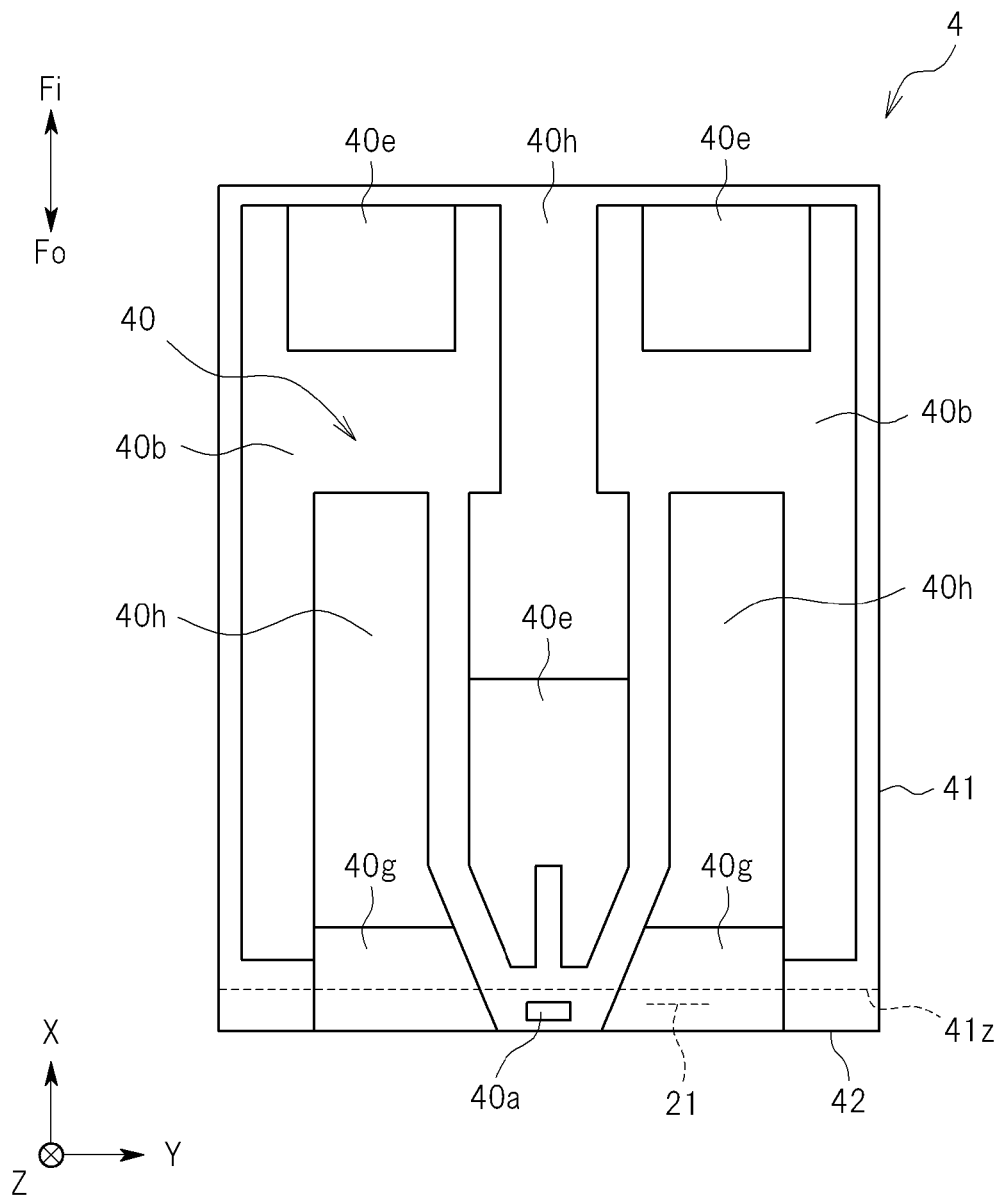
FIG. 3 is a plan view showing an example disk-facing surface of the head-slider of FIG. 2, in accordance with an embodiment of the present invention.
Figure 4:
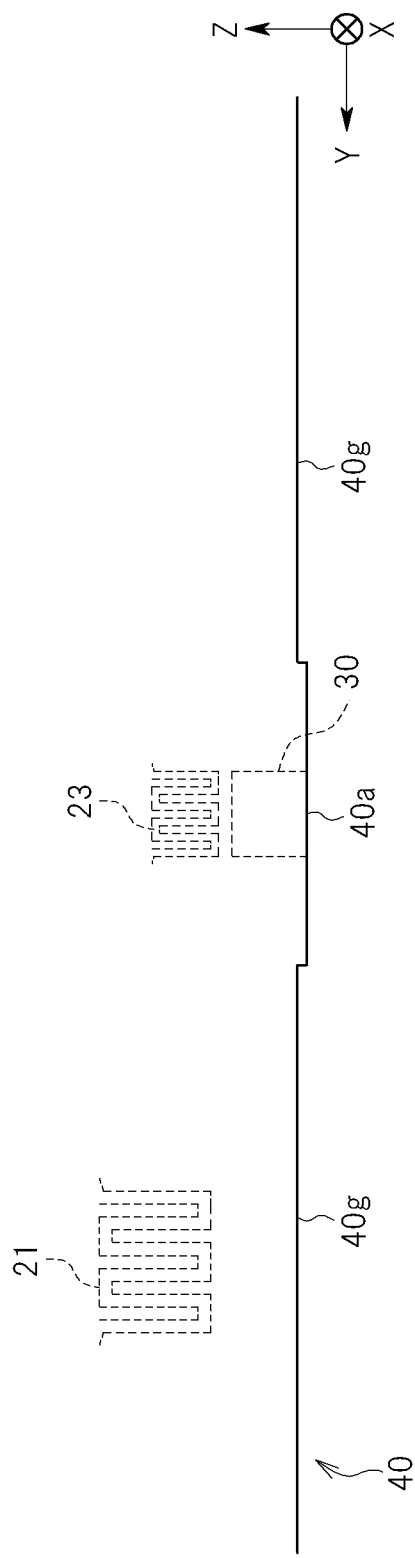
FIG. 4 is a cross-sectional view of the head-slider of FIGS. 2 and 3 as seen in a cross section that is parallel to a trailing edge of the head-slider, in accordance with an embodiment of the present invention.

With reference now to FIGS. 2 through 5, in accordance with embodiments of the present invention, the following are shown: in FIG. 2, a perspective view of the head-slider 4; in FIG. 3, a plan view showing a disk-facing surface 40 of the head-slider 4; in FIG. 4, a cross-sectional view seen at a trailing edge of a cross-section parallel to the trailing edge, which is a gas outflow side, Fo; and, a cross-sectional view showing a cross-section through the structure of the head-slider at the trailing edge perpendicular to the trailing edge, respectively. In FIGS. 2 through 5, X, Y and Z directions show a longitudinal direction, a width direction, and a thickness direction of the head-slider 4, respectively. Among the longitudinal direction, the width direction, and the thickness direction of the head-slider 4, the Z direction corresponds to and is referred to herein by the term of art, "flying direction," of the head-slider 4. The X and Y directions correspond to a rotation direction and a radial direction of the magnetic-recording disk 2, respectively, which correspond to a track-length direction of a track and a width direction of the head-slider 4, which coincides with the width direction of the track for the configuration shown in FIG. 5, respectively. A Fi direction corresponds to a direction toward a leading edge, which is gas inflow side, and a Fo direction corresponds to a direction toward the trailing edge, which is a gas outflow side.

The head-slider 4 is designed such that air-bearing surface (ABS) is formed on the disk-facing surface 40 facing the magnetic-recording disk 2; and, the head-slider flies in proximity with the recording surface of a rotating magnetic-recording disk 2 due to a wedge-film effect of air entrained between the head-slider 4 and the magnetic-recording disk 2, when the head-slider is disposed above the magnetic-recording disk 2 in a flying configuration. The disk-facing surface 40 is configured of several kinds of surfaces that are substantially parallel to one another, but differ in depth from one another. Specifically, the disk-facing surface 40 includes: a step bearing surface 40b being a surface closest to the magnetic-recording disk 2; shallow-recessed surfaces 40e each being slightly deep compared with the step bearing surface 40b; and, deep-recessed surfaces 40h being slightly deep compared with the shallow-recessed surfaces 40e. For example, each shallow-recessed surface 40e is formed at a depth of between about 100 nanometers (nm) to 300 nm compared with the step bearing surface 40b, and each deep-recessed surface 40h is formed at a depth of about 1 micrometer (μm) or more compared with the step bearing surface 40b. In FIGS. 3 and 4, depths of each surface are schematically shown.

Air flow caused by rotation of the magnetic-recording disk 2 is compressed by a tapered channel when the air flow enters the step bearing surface 40b from each shallow-recessed surface 40e, so that positive pressure, which is gas pressure exerted in a direction away from the magnetic-recording disk 2, is generated. On the other hand, when the air flow enters each deep-recessed surface 40h from the step bearing surface 40b or each shallow-recessed surface 40e, the air flow generates negative pressure, which is gas pressure exerted in a direction towards the magnetic-recording disk 2, because a channel is expanded.

An element surface 40a, on which an end portion of a combined reading and writing elements are located (subsequently described), is formed on an end proximate to the trailing edge Fo of the step bearing surface 40b. The element surface 40a may be formed, for example, by projecting from the step bearing surface 40b. Intermediate surfaces 40g, which have an intermediate depth between the shallow-recessed surface 40e and the deep-recessed surface 40h, are formed proximate to the trailing edge Fo of the deep-recessed surfaces 40h, respectively. Each of the intermediate surfaces 40g corresponds to a negative-pressure generation area, and is formed at a depth of, for example, 150 nm or more from the step bearing surface 40b.

Such a shape of the disk-facing surface 40 is formed by a technique such as ion milling or etching. For embodiments of the present invention, the shape of the disk-facing surface 40 is not limited to the shape in the example shown, and an alternative ABS may be appropriately used.

Figure 5:
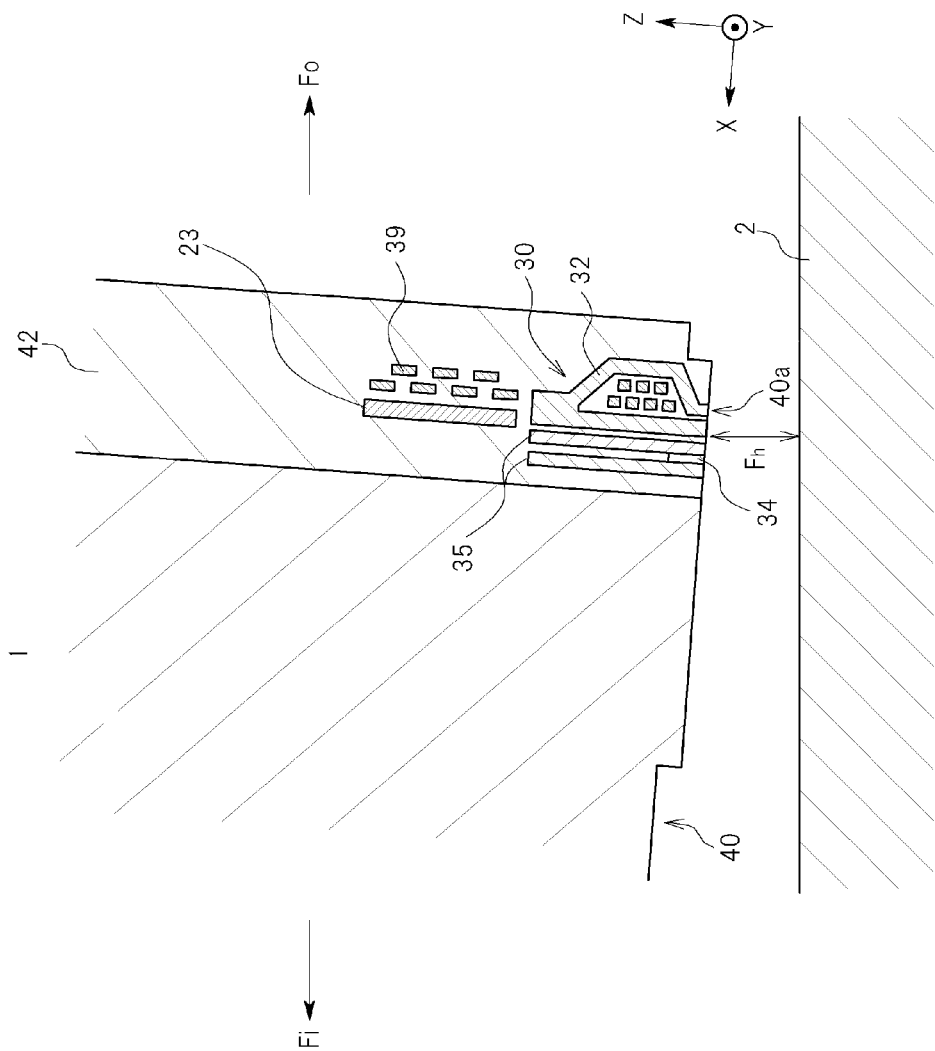
FIG. 5 is a cross-sectional view the head-slider of FIGS. 2 and 3 as seen in a cross section that is perpendicular to the trailing edge of the head-slider, in accordance with an embodiment of the present invention.

The head-slider 4 includes a slider substrate 41 including a sintered body of alumina and titanium carbide, which includes a flat, rectangular solid shape being relatively small in a thickness direction, and a magnetic-recording head 42 including alumina, which is formed on an end face 41z at a trailing edge of the slider substrate 41. As shown in FIGS. 4 and 5, combined reading and writing elements 30, a position-adjustment heating element 21, and a fly-height-adjustment heating element 23 are formed in the magnetic-recording head 42. The elements are electrically connected to an external circuit via wiring (not shown) formed in the magnetic-recording head 42.

The combined reading and writing elements 30 are formed in a central portion in a width direction and in a lower end portion in a thickness direction. As shown in FIG. 5, the combined reading and writing elements 30 include a write element 32 that emits a magnetic field to magnetically write data to the magnetic-recording disk 2, and a read element 34 that reads a read-back signal from a magnetic field that is a leakage field from the bits recorded on the magnetic-recording disk 2. In an embodiment of the present invention, the write element 32 may be formed in an approximately, inverted U shape having a slight gap formed in a lower end portion, by way of example without limitation thereto, and magnetized by a coil 39, and thus emits a magnetic-recording field from a lower end portion. The read element 34 includes a magnetoresistive sensor that is interposed between a pair of magnetic shields 35.

The fly-height-adjustment heating element 23 is disposed on an upper side in a thickness direction of the combined reading and writing elements 30, for example, a write element 32. The fly-height-adjustment heating element 23 is disposed at a position spaced away from the disk-facing surface 40, and the combined reading and writing elements 30 are disposed between the disk-facing surface 40 and the fly-height-adjustment heating element 23. The fly-height-adjustment heating element 23 is configured as a meandering thin-film resistor including a metal such as permalloy or nichrome, and heats the magnetic recording-head 42 by application an electrical current to the element 23 from an external circuit. Such heating causes thermal expansion of an alumina portion existing between the fly-height-adjustment heating element 23 and the combined reading and writing elements 30, so that the combined reading and writing elements 30 is displaced in the direction of the magnetic-recording disk 2, which is towards a lower side in a thickness direction; consequently, fly height Fh of the combined reading and writing elements 30 are reduced. Thus, in accordance with embodiments of the present invention, thermal fly-height control (TFC) is provided.

As shown in FIG. 4, the position-adjustment heating element 21 is disposed on one side in a width direction while being spaced by a certain distance away from the combined reading and writing elements 30 disposed in the center in the width direction. The position-adjustment heating element 21 is disposed on a slightly upper side compared with the combined reading and writing elements 30, and spaced from the disk-facing surface 40 by approximately the same distance as in the fly-height-adjustment heating element 23. In one embodiment of the present invention, the position-adjustment heating element 21 is formed in the same layer as the combined reading and writing elements 30 among layers configuring the magnetic-recording head 42, which includes a thin-film stacked portion. As shown in FIG. 3, in accordance with an embodiment of the present invention, the position-adjustment heating element 21 is designed such that when the element 21 is projected in a thickness direction with respect to the disk-facing surface 40; a projected position of the element 21 is included in a surface deeper than the shallow-recessed surface 40e, for example, in the intermediate surface 40g in the example shown.

The position-adjustment heating element 21 is configured as a meandering thin-film resistor including a metal such as permalloy or nichrome, and heats by application of an electrical current to the element 21 from an external circuit. Such heating causes thermal expansion of an alumina portion existing between the position-adjustment heating element 21 and the combined reading and writing elements 30, so that the combined reading and writing elements 30 is displaced to one side in a width direction. More specifically, when an amount of heating of the position-adjustment heating element 21 is increased, since the alumina portion is expanded, the combined reading and writing elements 30 is displaced in a direction away from the position-adjustment heating element 21. On the other hand, when the amount of heating of the position-adjustment heating element 21 is decreased, since the alumina portion is contracted, the combined reading and writing elements 30 is displaced in a direction towards the position-adjustment heating element 21.

In this way, the position-adjustment heating element 21 acts as a thermal actuator that displaces the combined reading and writing elements 30 in a width direction. Since the width direction corresponds to a width direction of a track formed on the magnetic-recording disk 2, positioning control of the combined reading and writing elements 30 may be performed by applying an electrical current to the position-adjustment heating element 21. Moreover, since a mechanical resonance characteristic does not exist for power transfer system from the position-adjustment heating element 21 to the combined reading and writing elements 30, servo bandwidth for positioning control of the combined reading and writing elements 30 may be increased.

Since the position-adjustment heating element 21 is located on a slightly upper side compared with the combined reading and writing elements 30, thermal expansion due to the position-adjustment heating element 21 acts on the combined reading and writing elements 30 even in a direction along a flying direction.

An example was shown in the above description, in which the position-adjustment heating element 21 was disposed on one side in the width direction with respect to the combined reading and writing elements 30. However, in accordance with embodiments of the present invention, the example shown is by way of example and not limitation thereto, as the position-adjustment heating element 21 may be disposed on both sides in the width direction with respect to the combined reading and writing elements 30.

Figure 6:
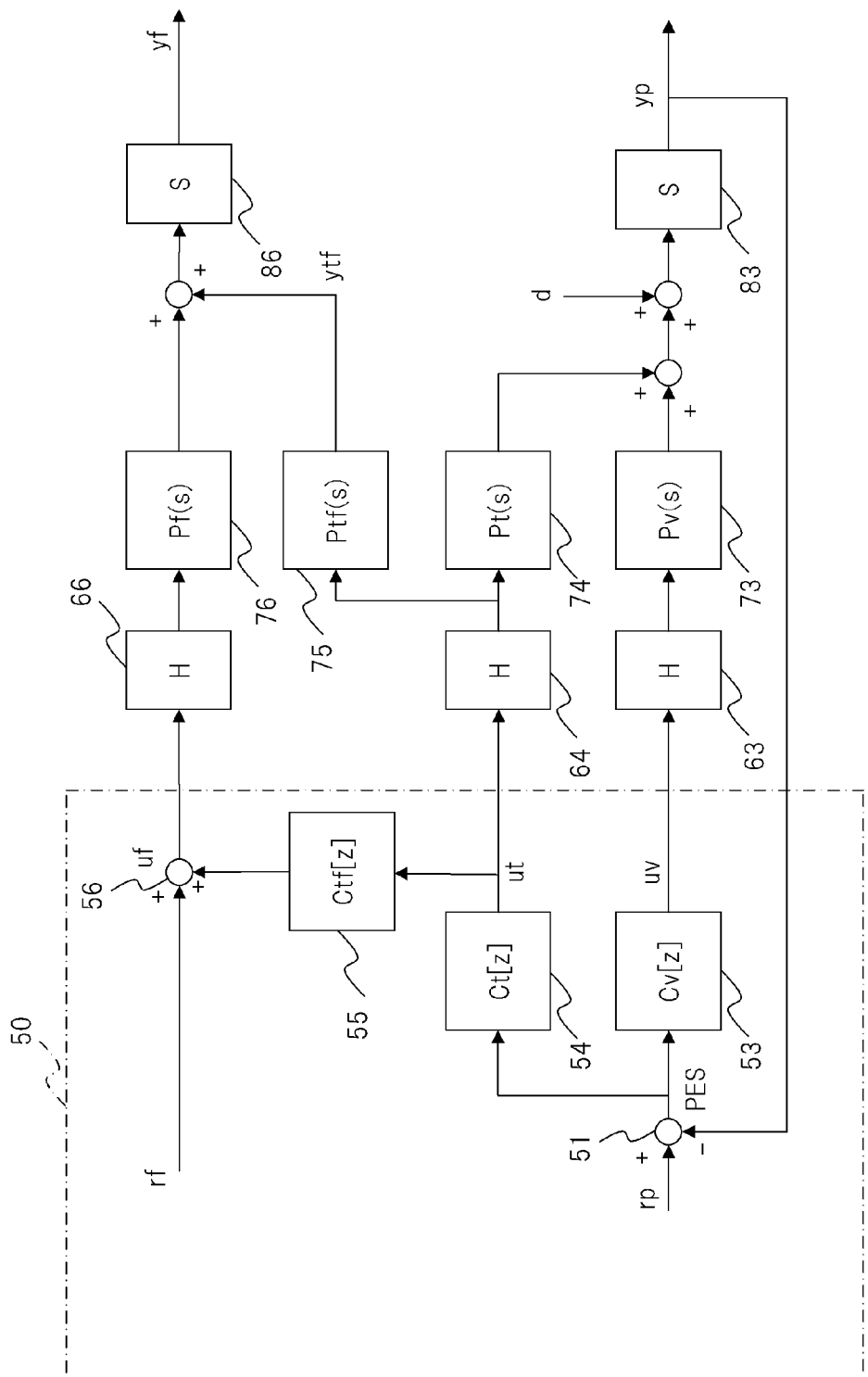
FIG. 6 is an example block diagram showing a first example of a control system of the HDD, in accordance with an embodiment of the present invention.

With now reference to FIG. 6, in accordance with embodiments of the present invention, a block diagram is shown that shows a first example of a control system of HDD 1. HDD 1 controls the position-adjustment heating element 21 and the fly-height-adjustment heating element 23 by using functions of a microprocessing unit (MPU) 50. First, a block outside the MPU 50 in FIG. 6 is described. The MPU 50 outputs a control signal uv for controlling the VCM 7, a control signal ut for controlling the position-adjustment heating element 21, and a control signal uf for controlling the fly-height-adjustment heating element 23.

Numerals 63, 64 and 66 indicate zero order hold (H) of the respective control signals uv, ut and uf; numeral 73 indicates a transfer characteristic (Pv(s)) from input into the VCM 7, which is control signal uv, to a position of the combined reading and writing elements 30; numeral 74 indicates a transfer characteristic (Pt(s)) from input into the position-adjustment heating element 21, which is an output signal of the zero order hold 64, to a position of the combined reading and writing elements 30; and, numeral 76 indicates a transfer characteristic (Pf(s)) from input into the fly-height-adjustment heating element 23, which is an output signal of the zero order hold 66, to fly height of the combined reading and writing elements 30.

Numeral 75 indicates a transfer characteristic (Ptf(s)) from input into the position-adjustment heating element 21, which is an output signal of the zero order hold 64, to fly height of the combined reading and writing elements 30. This is based on a fact that thermal expansion due to the position-adjustment heating element 21 acts on the combined reading and writing elements 30 even in the direction along the flying direction as previously described.

Numeral 83 indicates a sampler for a position of the combined reading and writing elements 30. The position of the combined reading and writing elements 30 includes output of the transfer characteristic (Pv(s)), output of the transfer characteristic (Pt(s)), and disturbance d, in a mixed signal. A head position signal yp showing a position of the combined reading and writing elements 30 is obtained by reading a position signal written on the magnetic-recording disk 2 by using the combined reading and writing elements 30, and demodulating the signal.

Numeral 86 indicates a sampler for fly height of the combined reading and writing elements 30. The fly height of the combined reading and writing elements 30 includes output of the transfer characteristic (Pf(s)), and output of the transfer characteristic (Ptf(s)), in a mixed signal. Furthermore, rf indicates a head fly-height control signal for controlling fly height independently of the positioning control system. The head fly-height control signal rf and the head fly-height signal yf showing fly height of the combined reading and writing elements 30 may be obtained by using a technique known in the art.

In addition, the MPU 50 functionally includes an adder 51, a coarse adjustment controller (Cv[z]) 53, and a fine adjustment controller (Ct[z]) 54. The adder 51 generates a position error signal (PES) being a difference between a target position signal rp included in a write instruction or read instruction, and the head position signal yp showing a position of the combined reading and writing elements 30. The coarse adjustment controller 53 generates a control signal uv for controlling the VCM 7 based on the PES, and outputs the control signal. Similarly, the fine adjustment controller 54 generates a control signal ut for controlling the position-adjustment heating element 21 based on the PES, and outputs the control signal.

Furthermore, the MPU 50 functionally includes a fly-height variation compensator (Ctf[z]) 55. The fly-height variation compensator 55 is a feedforward controller for compensating variation in fly height. The fly-height variation compensator 55 generates a signal for compensating variation in fly height of the combined reading and writing elements 30 due to heating of the position-adjustment heating element 21 based on the control signal ut that is output by the fine adjustment controller 54, and outputs the signal. Then, the signal is added to the head fly-height control signal rf by the adder 56; and thus, a control signal uf for controlling the fly-height-adjustment heating element 23 is outputted.

The fly-height variation compensator 55 may be configured by deriving a transfer characteristic (Ptf(s)) 75 from input, which is a control signal ut, into the position-adjustment heating element 21 to fly height of the combined reading and writing elements 30, and a transfer characteristic (Pf(s)) 76 from input, which is a control signal uf, into the fly-height-adjustment heating element 23 for fly height of the combined reading and writing elements 30, and obtaining respective inverse characteristics of the transfer characteristics. Thus, variation in fly height of the combined reading and writing elements 30 due to heating of the position-adjustment heating element 21 is compensated by operation of the fly-height variation compensator 55.

Figure 7:
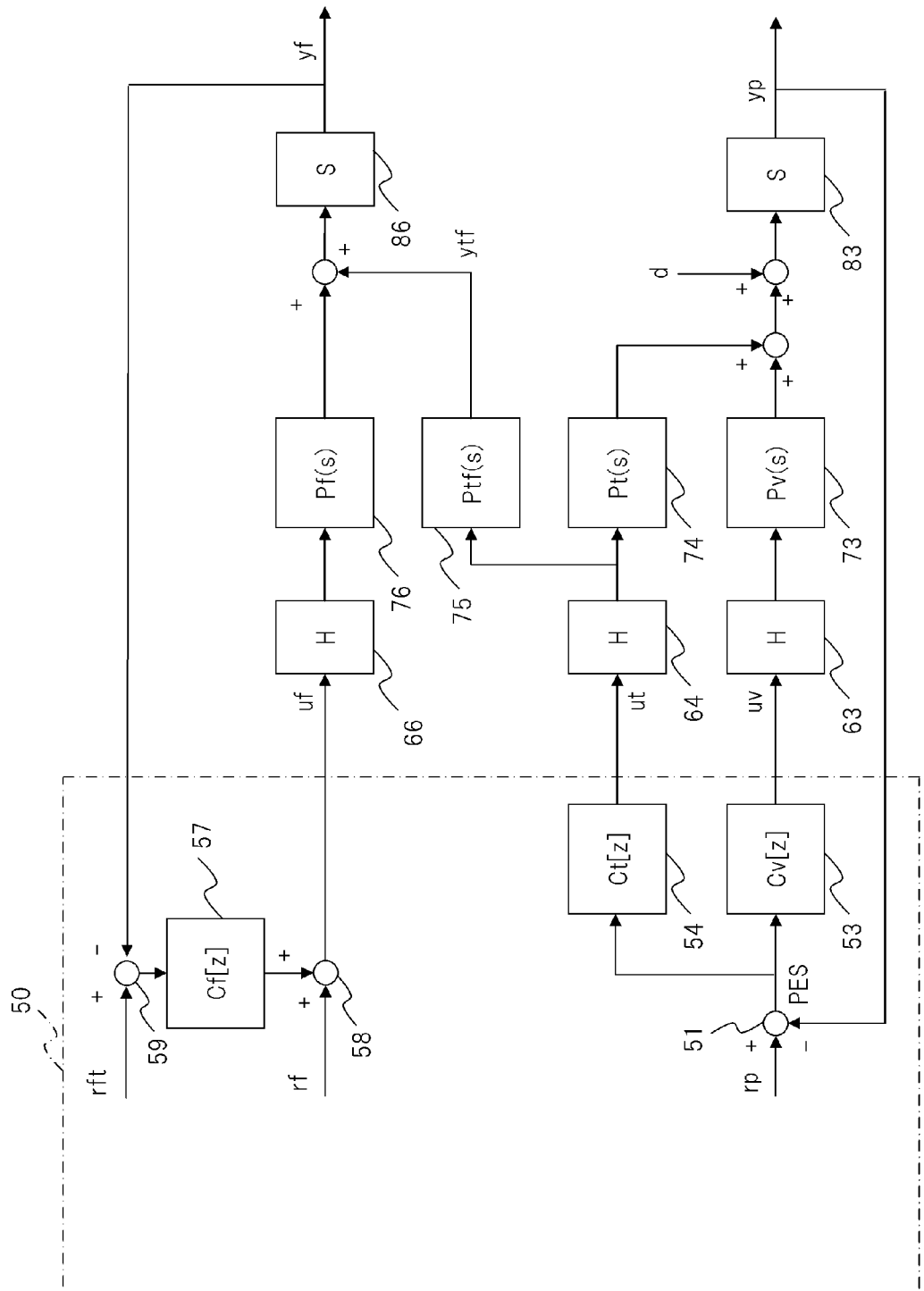
FIG. 7 is an example block diagram showing a second example of the control system of the HDD, in accordance with an embodiment of the present invention.

With now reference to FIG. 7, in accordance with embodiments of the present invention, a block diagram is shown that shows a second example of a control system of HDD 1. Configurations in common with those of the above-described example are marked with the same numbers; and, detailed description of these common configurations is omitted from the subsequent discussion. MPU 50 in the example functionally includes a fly-height variation compensator (Cf[z]) 57 and adders 58 and 59. The adder 59 is a fly-height variation detector, which obtains a difference between the head fly-height signal yf and a target-value signal rft of fly height of the combined reading and writing elements 30, so that the fly-height variation detector detects variation in fly height of the combined reading and writing elements 30, and outputs a detection signal. The fly-height variation compensator 57 is a feedback controller for compensating variation in fly height, which generates a signal for compensating variation in fly height of the combined reading and writing elements 30 based on the detection signal from the adder 59, and outputs the signal. Then, the signal is added to the head fly-height control signal rf by the adder 58; and thus, a control signal of for controlling the fly-height-adjustment heating element 23 is outputted.

Figure 8:
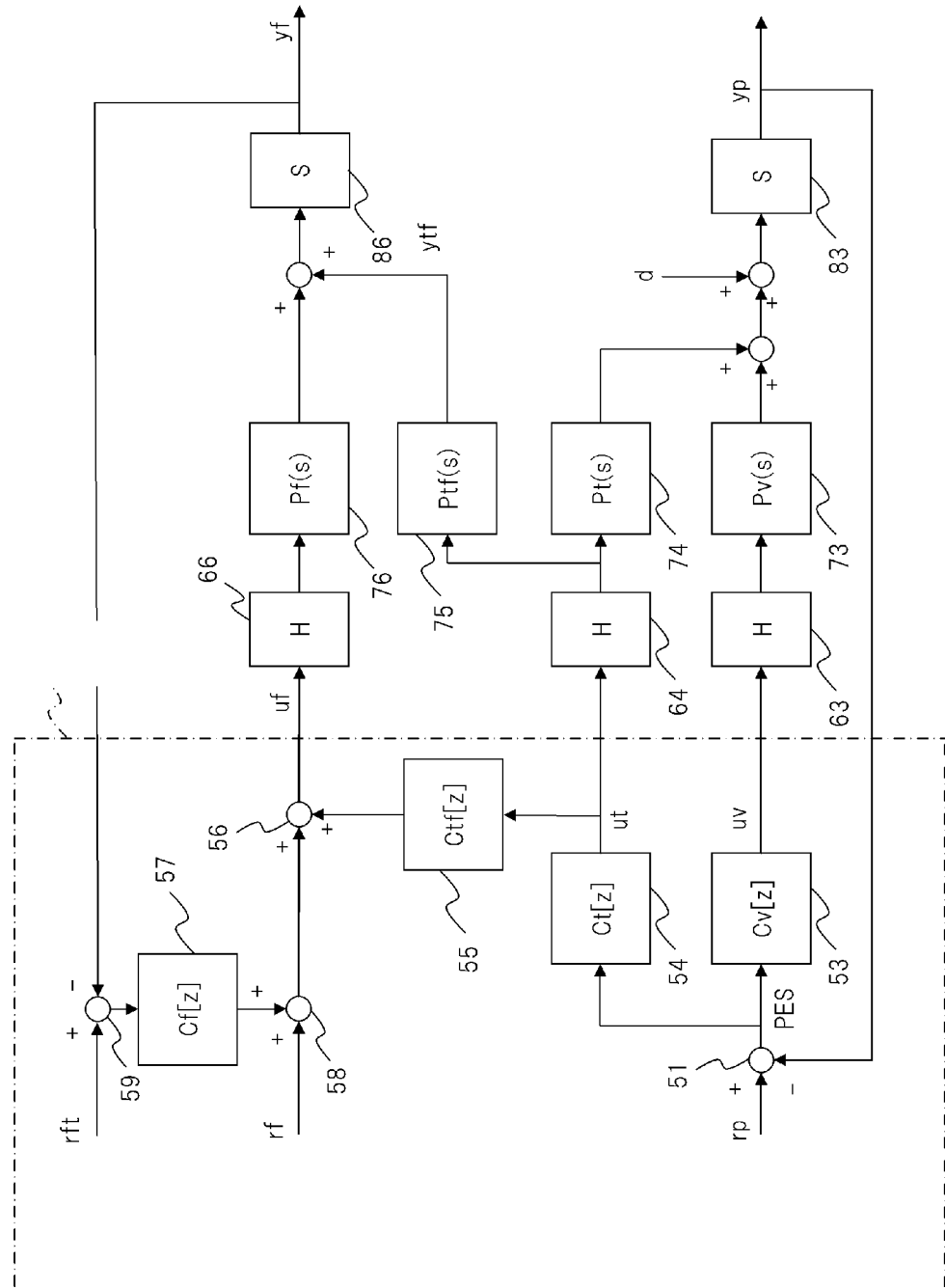
FIG. 8 is an example block diagram showing a third example of the control system of the HDD, in accordance with an embodiment of the present invention.

With now reference to FIG. 8, in accordance with embodiments of the present invention, a block diagram is shown that shows a third example of a control system of HDD 1. Configurations in common with those of the above-described examples are marked with the same numbers; and, detailed description of these common configurations is omitted from the subsequent discussion. This example is a combination of the first example and the second example. That is, in the example, since the feedforward control using the fly-height variation compensator 55 is combined with the feedback control using the fly-height variation compensator 57, variation of the combined reading and writing elements 30 may be effectively suppressed.

The control examples described above may be similarly applied to a head-slider 4 having position-adjustment heating elements 21 disposed on both sides in a width direction with respect to the combined reading and writing elements 30. In this case, a fine adjustment controller 54 is provided for each position-adjustment heating element 21; and, a fly-height variation compensator 55 is provided for each fine adjustment controller 54.

As subsequently described herein, the control is described using specific numerical-calculation examples. In the control system of HDD 1, sampling time of the zero order hold H and sampling time of the sampler S are assumed to be 27.8 microseconds (μsec), respectively. Moreover, sampling time of the target position signal rp, sampling time of the head fly-height control signal rf, and sampling time of a target-value signal rft of fly height of the combined reading and writing elements 30 are given as zero, respectively.

Figure 9:
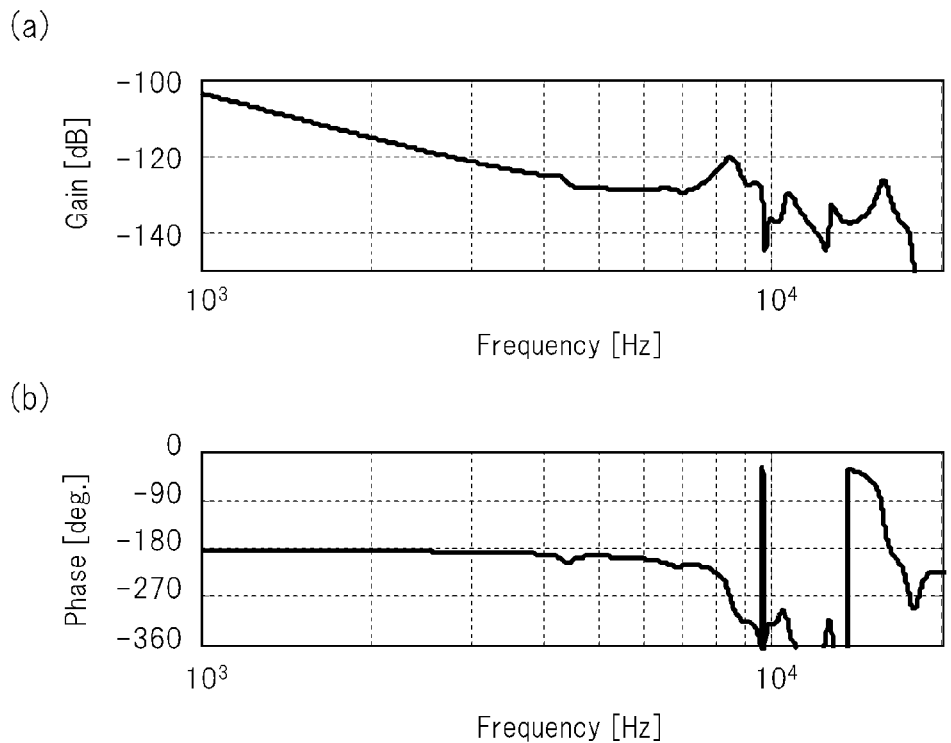
FIGS. 9(a) and 9(b) are example diagrams showing a gain-to-frequency characteristic and a phase-to-frequency characteristic of Pv(s), in accordance with an embodiment of the present invention.

The transfer characteristic (Pv(s)) 73 from input into the VCM 7, which is an output signal of the zero order hold 63, to a position of the combined reading and writing elements 30 is assumed to have a gain-to-frequency characteristic as shown in FIG. 9(*a*), and a phase-to-frequency characteristic as shown in FIG. 9(*b*).

Figure 10:
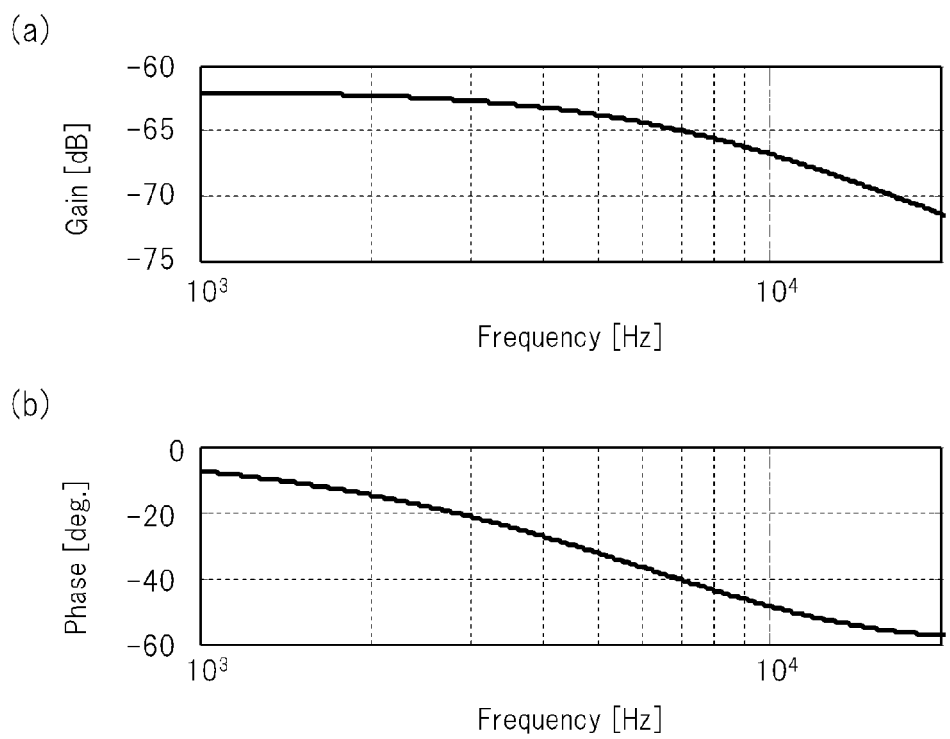
FIGS. 10(a) and 10(b) are example diagrams showing a gain-to-frequency characteristic and a phase-to-frequency characteristic of Pt(s), in accordance with an embodiment of the present invention.

The transfer characteristic (Pt(s)) 74 from input into the position-adjustment heating element 21, which is an output signal of the zero order hold 64, to a position of the combined reading and writing elements 30 is assumed to have a gainto-frequency characteristic as shown in FIG. 10(*a*), and a phase-to-frequency characteristic as shown in FIG. 10(*b*).

Figure 11:
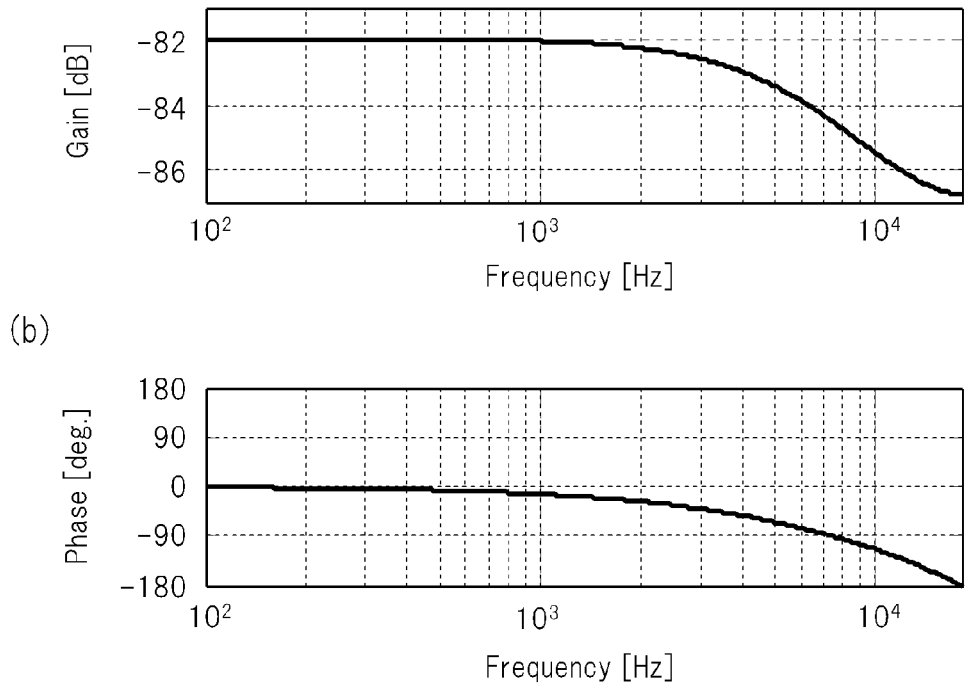
FIGS. 11(a) and 11(b) are example diagrams showing a gain-to-frequency characteristic and a phase-to-frequency characteristic of Ptf(s), in accordance with an embodiment of the present invention.

The transfer characteristic (Ptf(s)) 75 from input into the position-adjustment heating element 21, which is an output signal of the zero order hold 64, to fly height of the combined reading and writing elements 30 is assumed to have a gain-to-frequency characteristic as shown in FIG. 11(*a*), and a phase-to-frequency characteristic as shown in FIG. 11(*b*).

Figure 12:
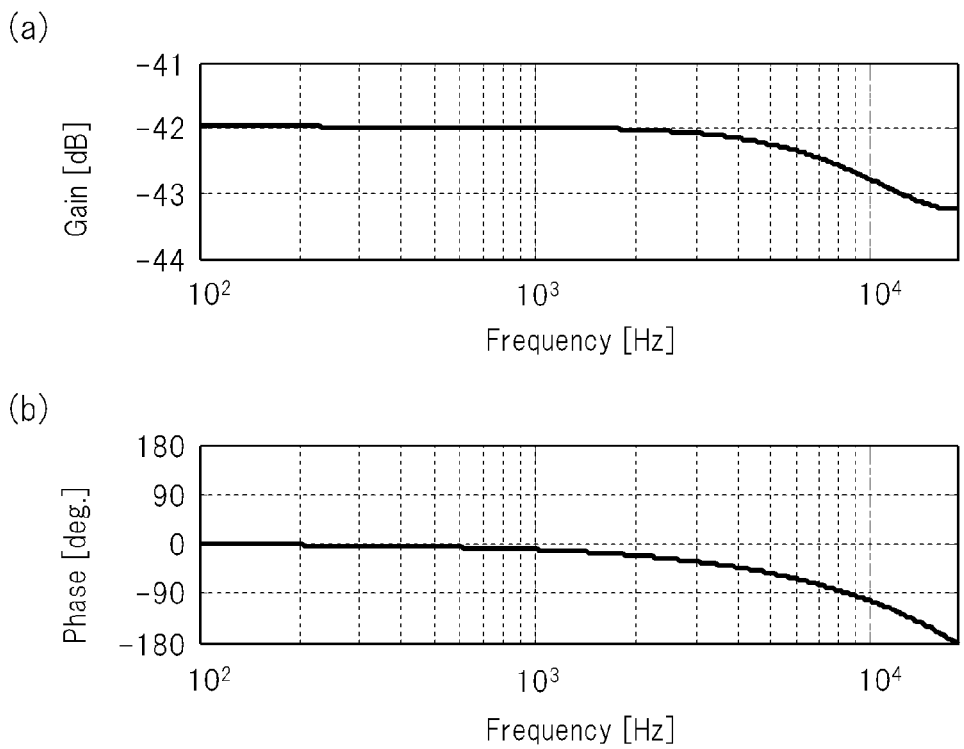
FIGS. 12(a) and 12(b) are example diagrams showing a gain-to-frequency characteristic and a phase-to-frequency characteristic of Pf(s), in accordance with an embodiment of the present invention.

The transfer characteristic (Pf(s)) 76 from input into the fly-height-adjustment heating element 23, which is an output signal of the zero order hold 65, to fly height of the combined reading and writing elements 30 is assumed to have a gain-to-frequency characteristic as shown in FIG. 12(*a*), and a phase-to-frequency characteristic as shown in FIG. 12(*b*).

Figure 13:
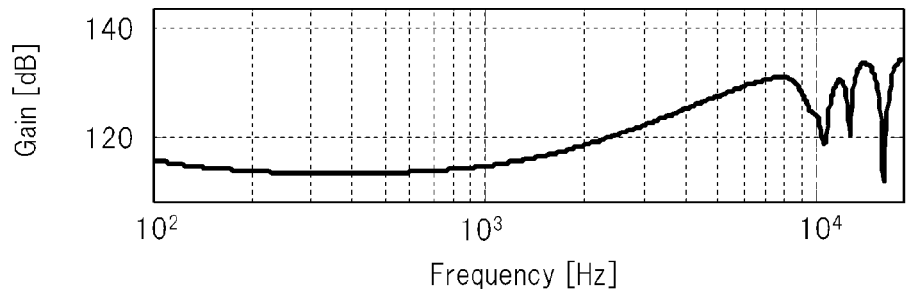
FIGS. 13(a) and 13(b) are example diagrams showing a gain-to-frequency characteristic and a phase-to-frequency characteristic of Cv(z), in accordance with an embodiment of the present invention.
Figure 13:
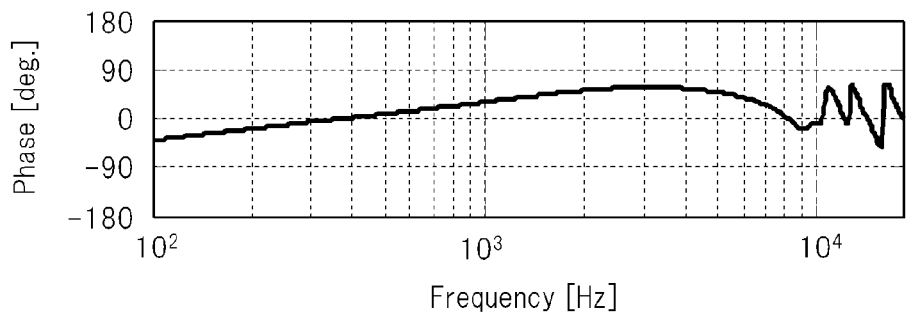

The coarse adjustment controller (Cv[z]) 53 is assumed as a combination of a PI-Lead filter and a Notch filter, each filter being a known technique, and assumed to have a gain-to-frequency characteristic as shown in FIG. 13(*a*), and a phase-to-frequency characteristic as shown in FIG. 13(*b*).

Figure 14:
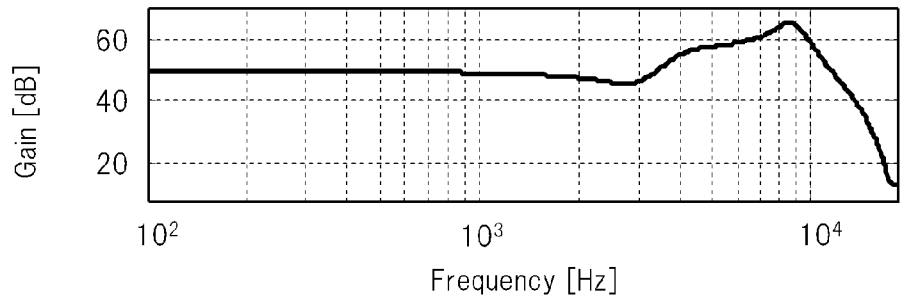
FIGS. 14(a) and 14(b) are example diagrams showing a gain-to-frequency characteristic and a phase-to-frequency characteristic of Ct(z), in accordance with an embodiment of the present invention.
Figure 14:
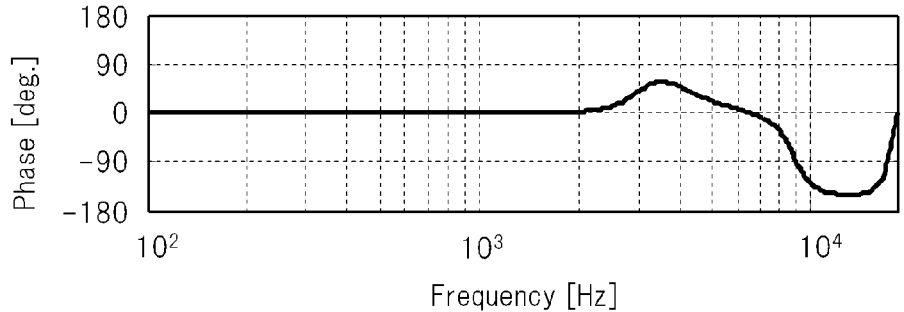

The fine controller (Ct[z]) 54 is given as the following numerical expression 1, and assumed to have a gain-to-frequency characteristic as shown in FIG. 14(*a*), and a phase-to-frequency characteristic as shown in FIG. 14(*b*).

$$220.0669 \frac{(z^2 + 1.734z + 0.766)}{(z^2 - 1.299z + 0.6802)} \frac{(z^2 - 1.569z + 0.8168)}{(z^2 - 0.07109z + 0.7393)}$$ [Numerical expression 1]

Figure 15:
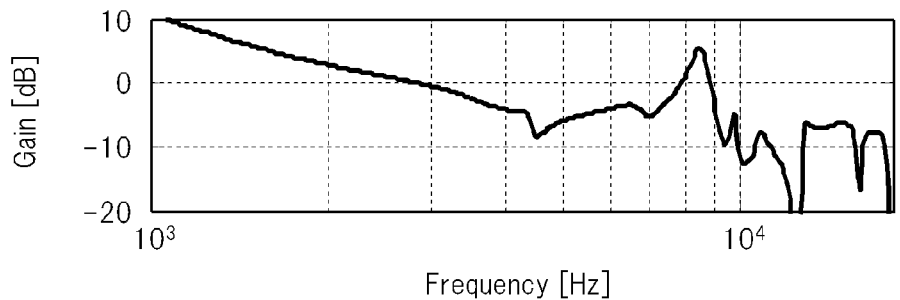
FIGS. 15(a) and 15(b) are example diagrams showing a gain-to-frequency characteristic and a phase-to-frequency characteristic of an open-loop transfer characteristic in a reference example, in accordance with an embodiment of the present invention.
Figure 15:
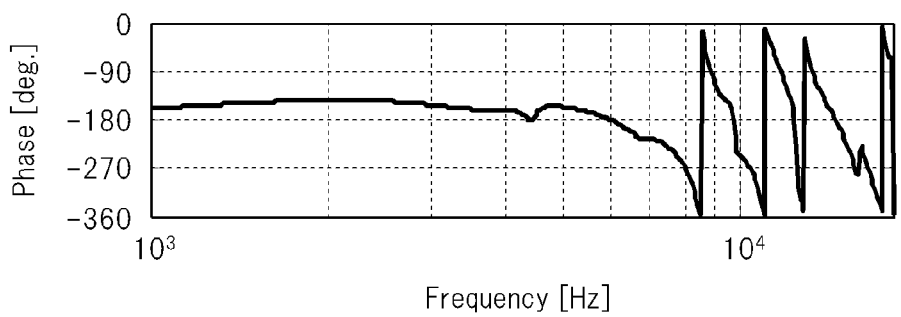
Figure 16:
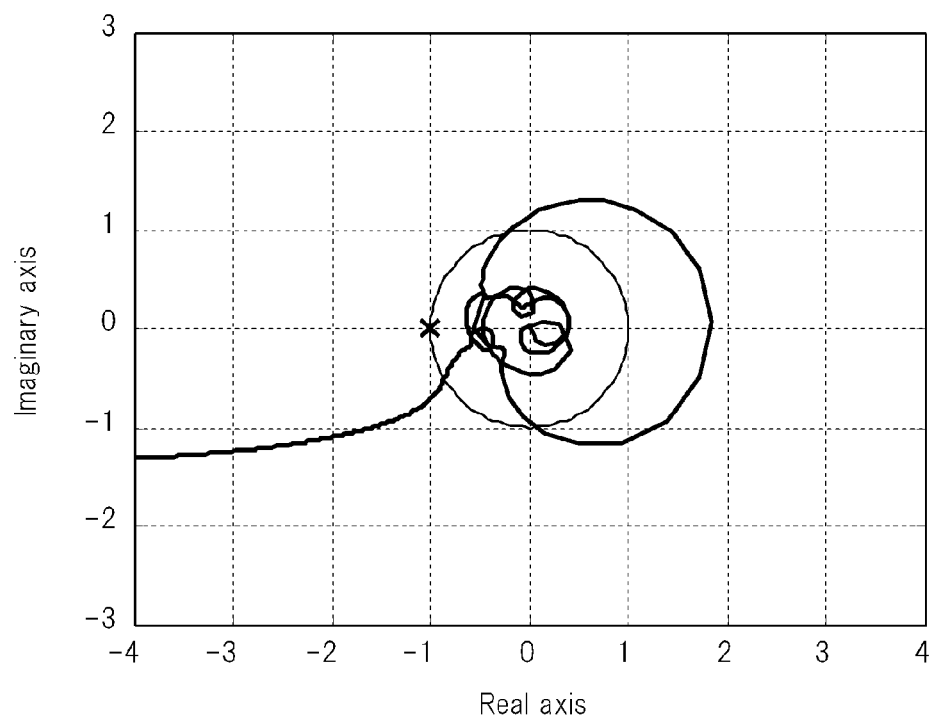
FIG. 16 is an example Nyquist diagram of the open-loop transfer characteristic in the reference example, in accordance with an embodiment of the present invention.
Figure 17:
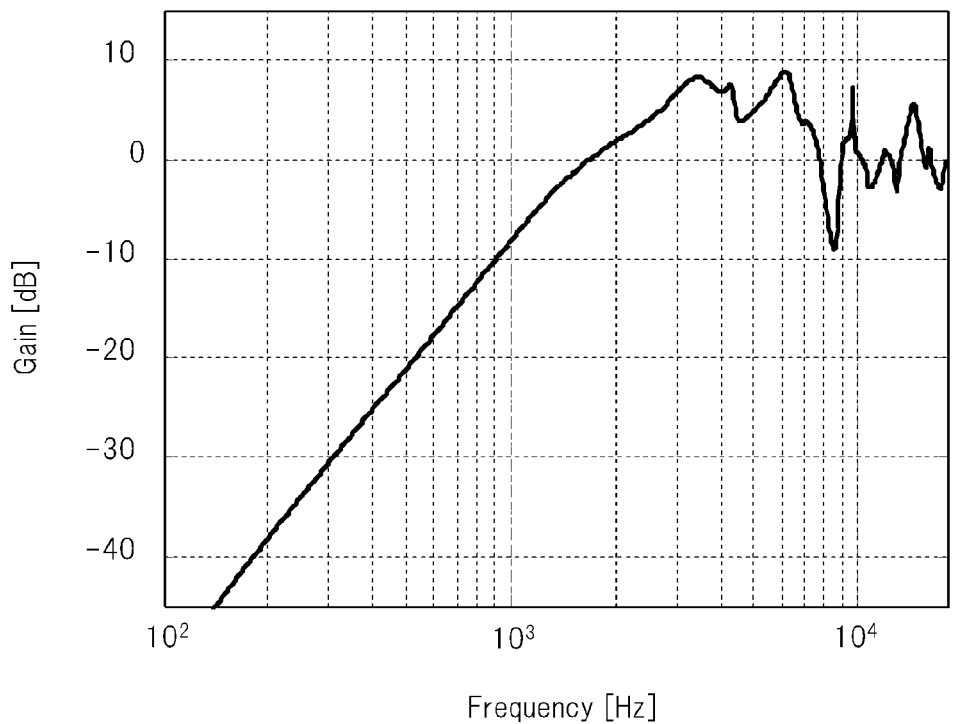
FIG. 17 is an example diagram showing gain-to-frequency response of a sensitivity function in the reference example, in accordance with an embodiment of the present invention.

Here, in the case that the fly-height variation compensator 55 and 57 are not provided in the first to third examples, which may serve as a reference example, an open-loop transfer characteristic at a point of the head position signal yp was calculated. As a result, gain-to-frequency response was obtained as FIG. 15(*a*), phase-to-frequency response was obtained as FIG. 15(*b*), and a Nyquist diagram was obtained as FIG. 16. In addition, gain-to-frequency response of a transfer characteristic, which is a sensitivity function, from a disturbance d to the head position signal yp, which corresponds to a disturbance suppression characteristic in this reference example, was obtained as FIG. 17. These results show that a head positioning control system is provided by the control system of the reference example, in which a gain 0 decibel (dB) cross frequency of the open-loop transfer characteristic is about 3 kilohertz (kHz), and a disturbance signal of 1800 hertz (Hz) or less may be suppressed by a feedback control system.

Figure 18:
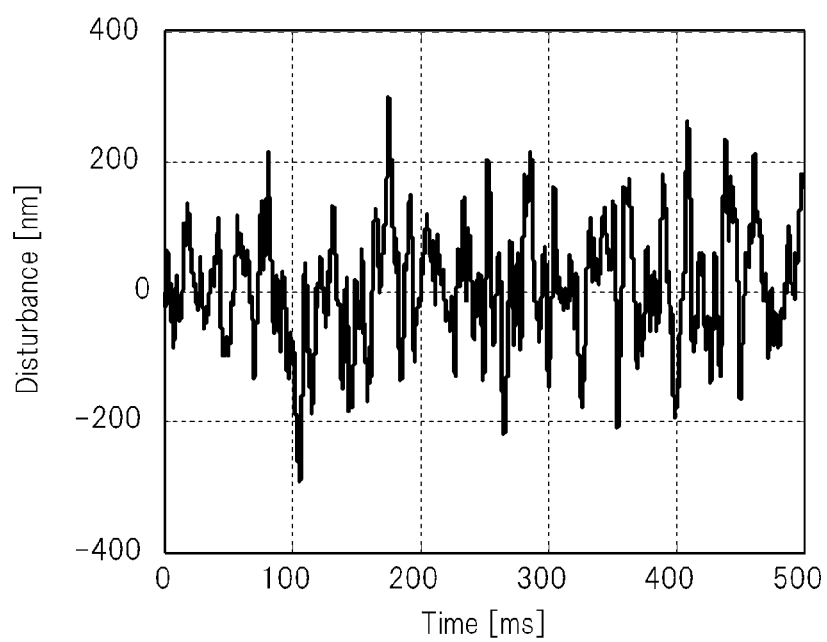
FIG. 18 is an example diagram showing a waveform of a disturbance signal, in accordance with an embodiment of the present invention.
Figure 19:
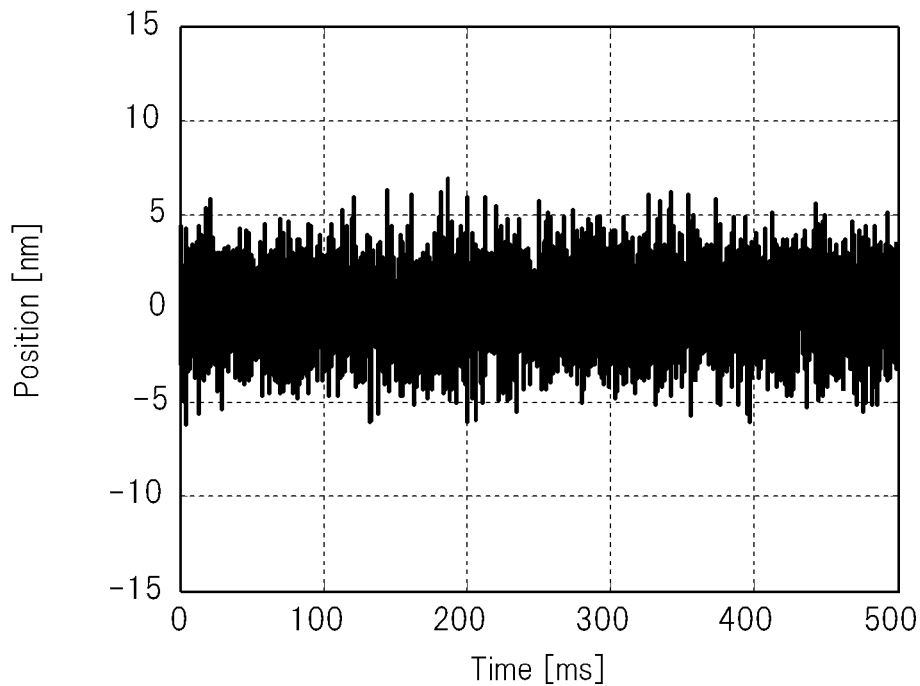
FIG. 19 is an example diagram showing a waveform of yp in the reference example
Figure 20:
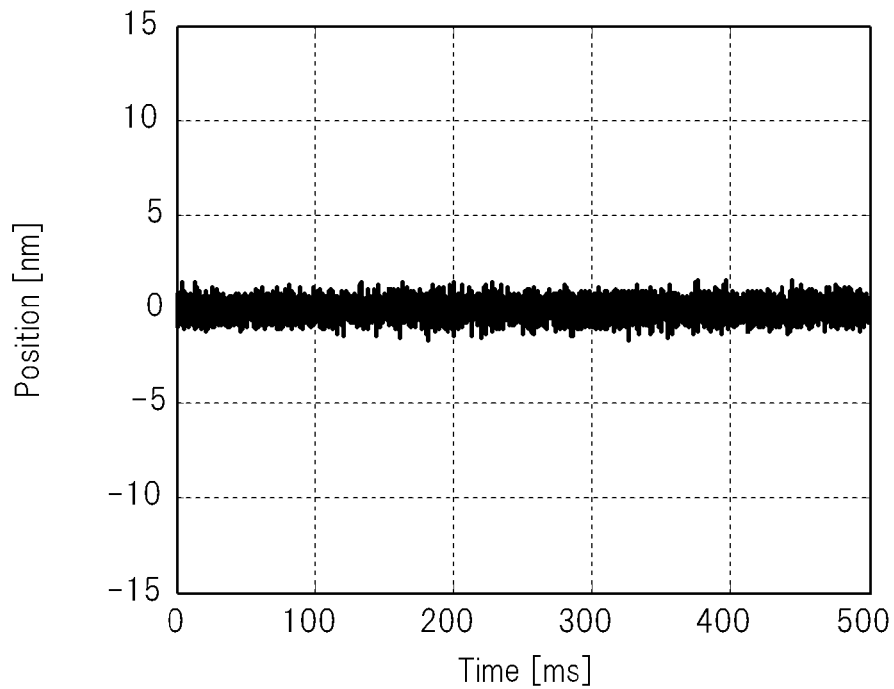
FIG. 20 is an example diagram showing a waveform of output of a transfer characteristic (Pt(s)) in the reference example, in accordance with an embodiment of the present invention.
Figure 21:
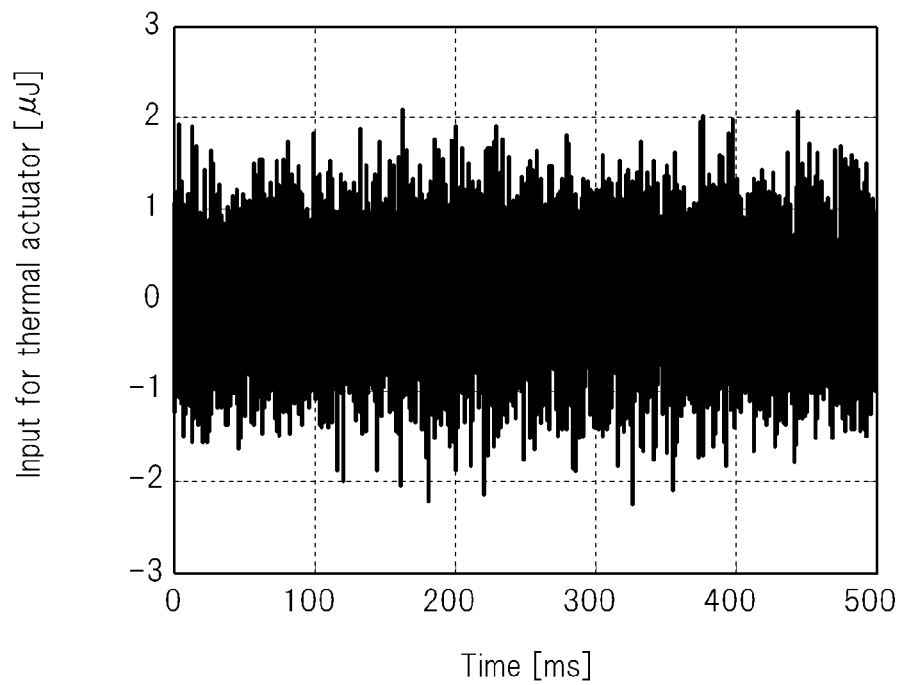
FIG. 21 is an example diagram showing a waveform of input of the transfer characteristic (Pt(s)) in the reference example, in accordance with an embodiment of the present invention.
Figure 22:
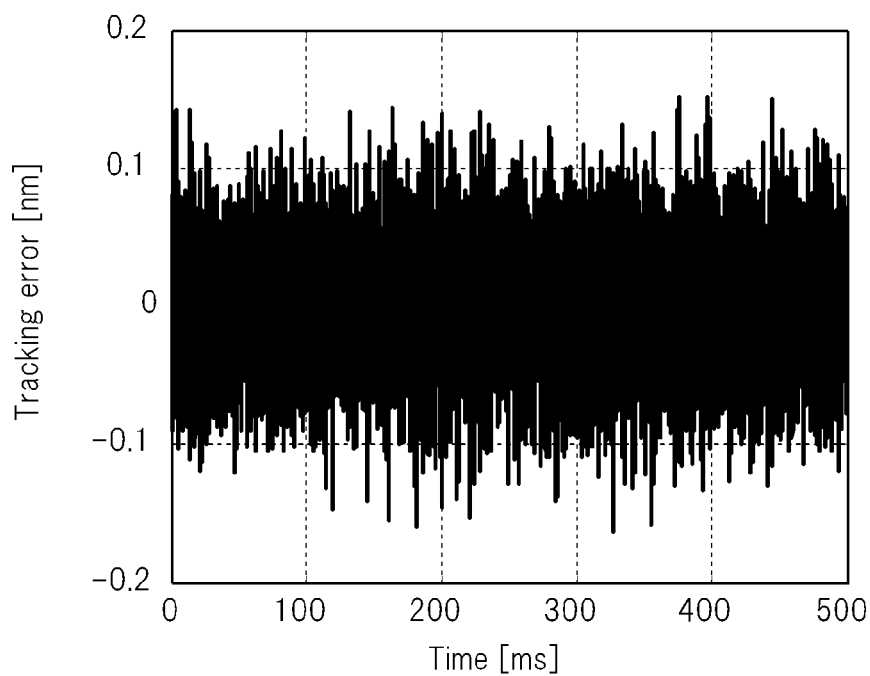
FIG. 22 is an example diagram showing time response of yf in the reference example, in accordance with an embodiment of the present invention.

Time response simulation in the reference example was investigated. When a signal as shown in FIG. 18 is inputted as the disturbance signal d, the head position signal yp has a waveform as shown in FIG. 19, which shows that the effect of the disturbance signal d is compensated. Here, output of the transfer characteristic (Pt(s)) 74 has a waveform as shown in FIG. 20, and input thereof has a waveform as shown in FIG. 21. In this case, yf, which is given by sampling output ytf of the transfer characteristic (Ptf(s)) 75, corresponds to variation in fly height due to the position-adjustment heating element 21. FIG. 22 shows time response of yf.

Figure 23:
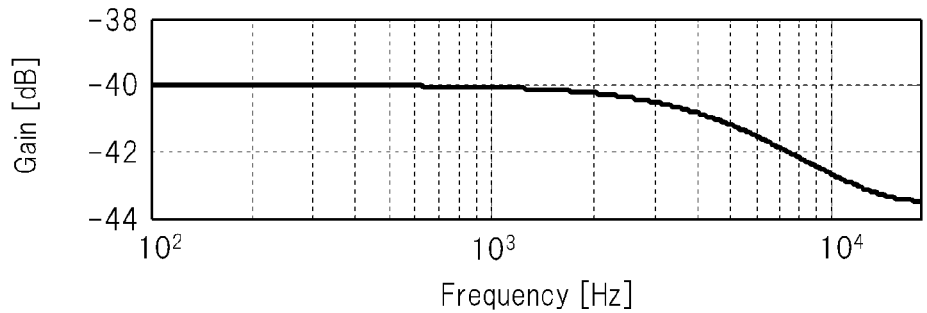
FIGS. 23(a) and 23(b) are example diagrams showing a gain-to-frequency characteristic and a phase-to-frequency characteristic of a fly-height variation compensator (Ctf[z]) in the first example, in accordance with an embodiment of the present invention.
Figure 23:
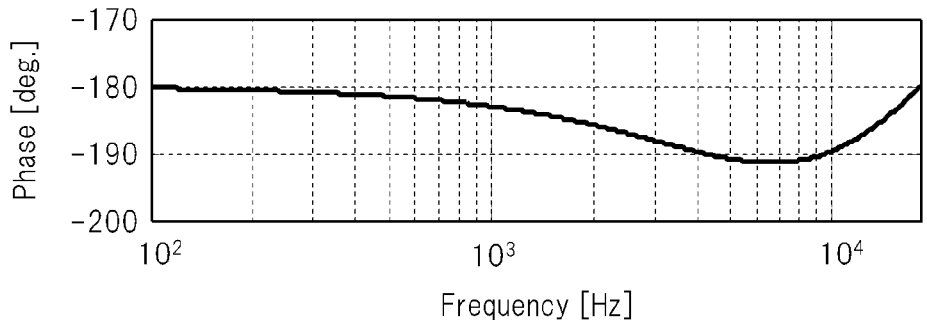

A simulation result on the first example shown in FIG. 6 is next described. As previously described, the first example includes the fly-height variation compensator (Ctf[z]) 55. Here, the fly-height variation compensator (Ctf[z]) 55 is given as the following numerical expression 2 so as to represent a characteristic of −Ptf(s)/Pf(s), and is assumed to have a gain-to-frequency characteristic as shown in FIG. 23(*a*), and a phase-to-frequency characteristic as shown in FIG. 23(*b*).

$$-0.0078456 \frac{z(z - 0.08892)(z - 0.03383)}{z(z - 0.2982)(z - 0.01594)}$$ [Numerical expression 2]

Figure 24:
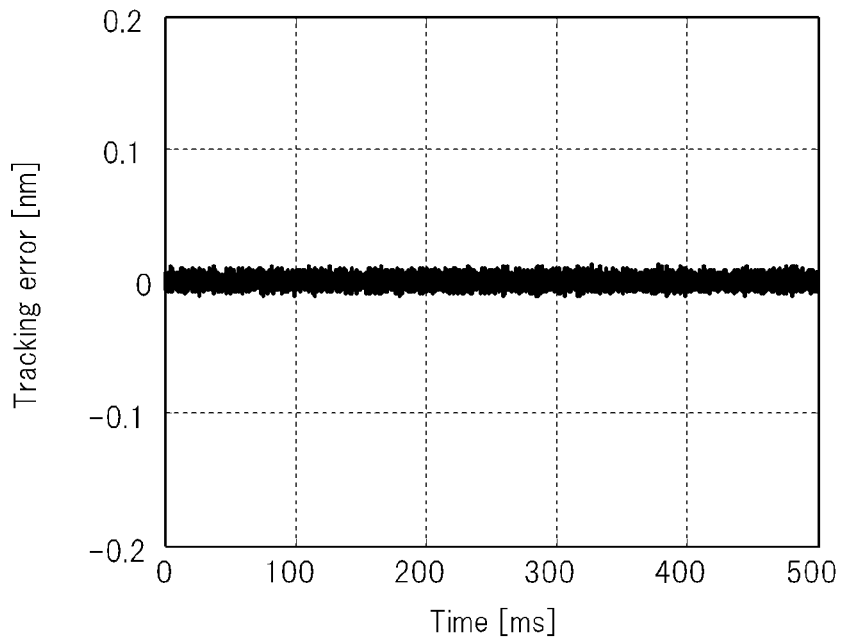
FIG. 24 is an example diagram showing a waveform of yf in the first example, in accordance with an embodiment of the present invention.

In the control system of the first example, when a signal as shown in FIG. 18 is inputted as the disturbance signal d, the head fly-height signal yf showing fly height of the combined reading and writing elements 30 has a waveform as shown in FIG. 24. Thus, the variation in fly height of the combined reading and writing elements 30 is suppressed less in this case compared with the result of FIG. 22.

Figure 25:
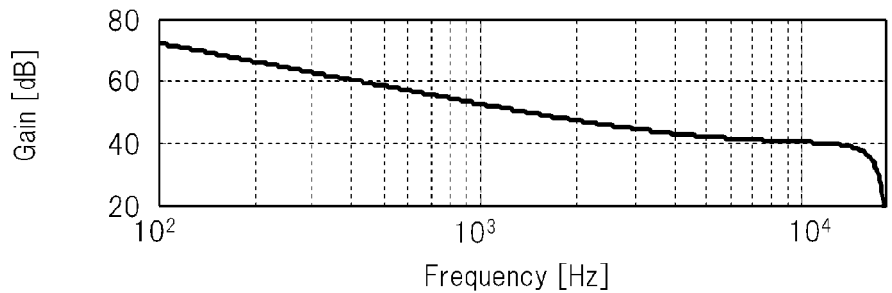
FIGS. 25(a) and 25(b) are example diagrams showing a gain-to-frequency characteristic and a phase-to-frequency characteristic of a fly-height variation compensator (Cf[z]) in the second example, in accordance with an embodiment of the present invention.
Figure 25:
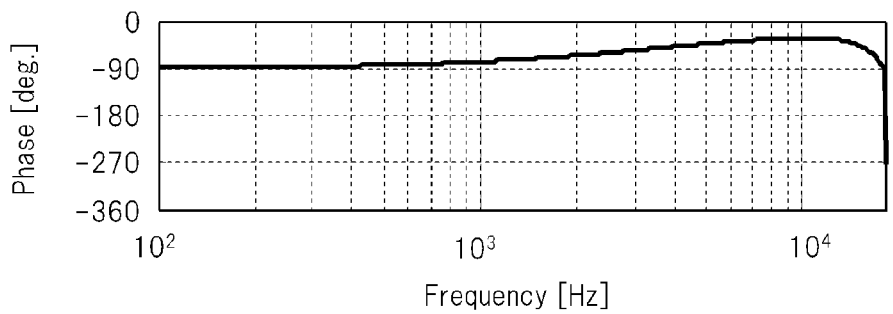

A simulation result of the second example shown in FIG. 7 is next described. As previously described, the second example includes the fly-height variation compensator (Cf[z]) 57. Here, the fly-height variation compensator (Cf[z]) 57 is given as the following numerical expression 3, and assumed to have a gain-to-frequency characteristic as shown in FIG. 25(*a*), and a phase-to-frequency characteristic as shown in FIG. 25(*b*).

$$114.4095 \frac{(z + 1)(z - 0.4825)}{(z - 1)(z + 0.6271)}$$ [Numerical expression 3]

Figure 26:
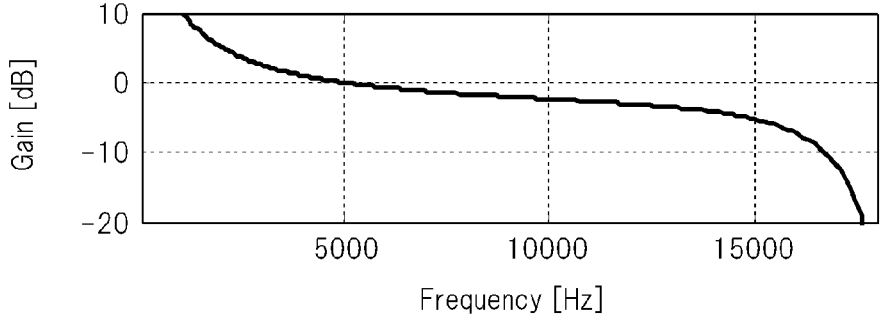
FIGS. 26(a) and 26(b) are example diagrams showing a gain-to-frequency characteristic and a phase-to-frequency characteristic of an open-loop transfer characteristic in the second example, in accordance with an embodiment of the present invention.
Figure 26:
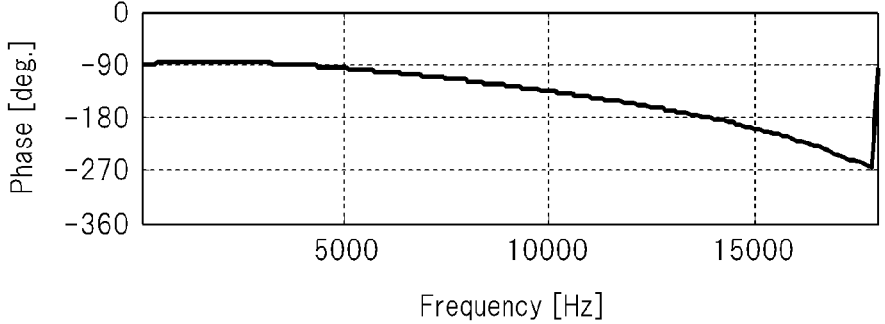
Figure 27:
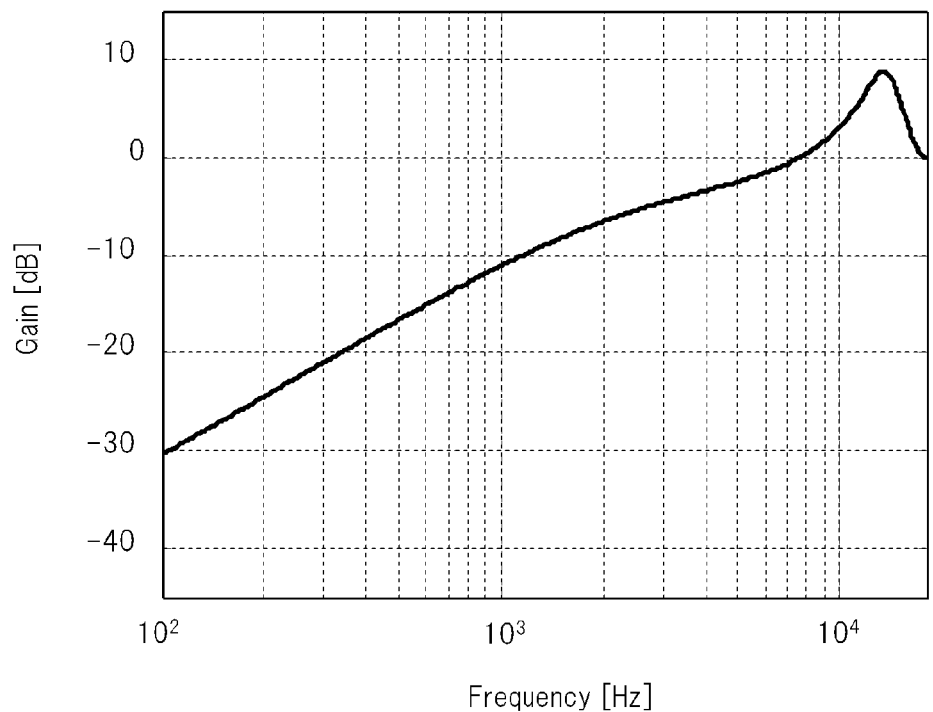
FIG. 27 is an example diagram showing gain-to-frequency response of a sensitivity function in the second example, in accordance with an embodiment of the present invention.

Here, an open-loop transfer characteristic at a point of the head fly-height signal yf in the second example was calculated. As a result, gain-to-frequency response was obtained as FIG. 26(*a*), and phase-to-frequency response was obtained as FIG. 26(*b*). In addition, gain-to-frequency response of a transfer characteristic, which is a sensitivity function, from output ytf of the transfer characteristic (Ptf(s)) 75 to the head fly-height signal yf, which corresponds to a disturbance suppression characteristic in this control system, was obtained as FIG. 27. These results show that a head positioning control system is provided by the control system, in which a gain 0 dB cross frequency of the open-loop transfer characteristic is about 5 kHz, and a disturbance signal of 7 kHz or less may be suppressed by a feedback control system.

Figure 28:
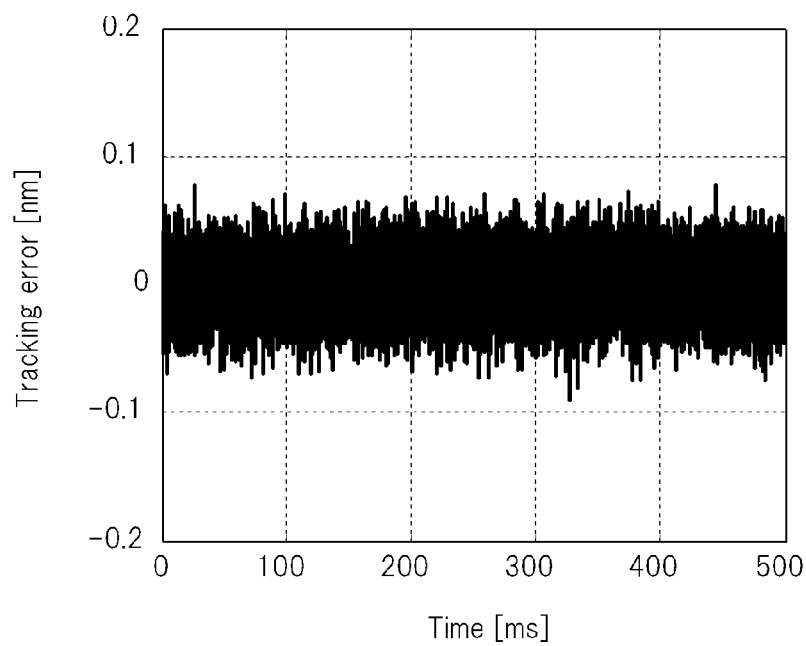
FIG. 28 is an example diagram showing a waveform of yf in the second example, in accordance with an embodiment of the present invention.

In the control system of the second example, when a signal as shown in FIG. 18 is inputted as the disturbance signal d, the head fly-height signal yf has a waveform as shown in FIG. 28. Thus, the variation in fly height of the combined reading and writing elements 30 is suppressed less compared with the result of FIG. 22.

Figure 29:
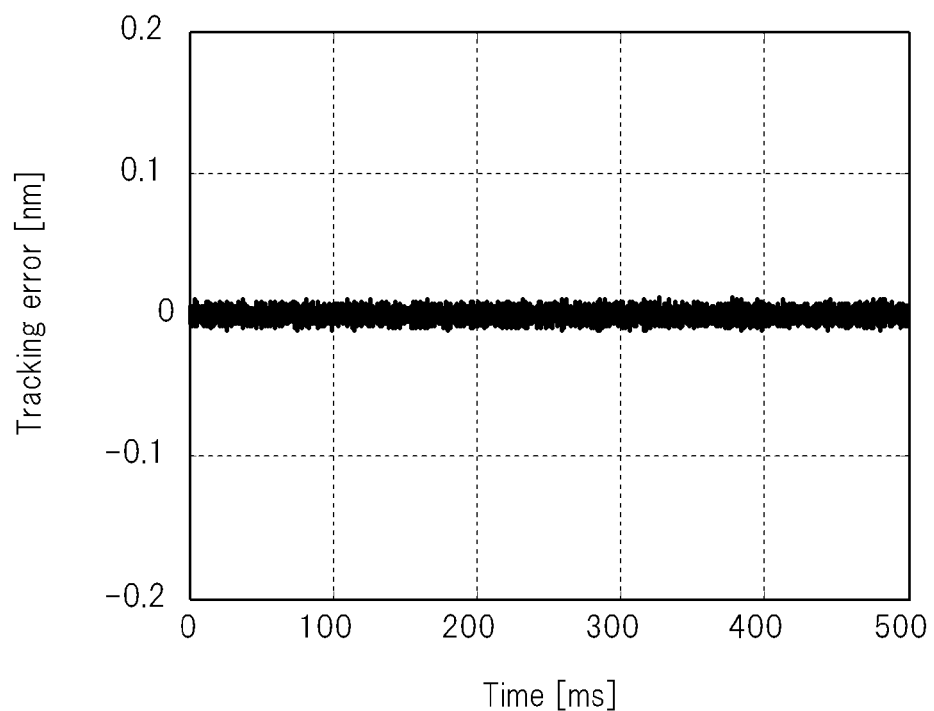
FIG. 29 is an example diagram showing a waveform of yf in the third example, in accordance with an embodiment of the present invention.

A simulation result of the third example shown in FIG. 8 is next described. As previously described, the third example includes the fly-height variation compensator (Ctf[z]) 55 and the fly-height variation compensator (Cf[z]) 57. In the control system of the third example, when a signal as shown in FIG. 18 is inputted as the disturbance signal d, the head fly-height signal yf has a waveform as shown in FIG. 29. Thus, the variation in fly height of the magnetic head is suppressed less in this case compared with the result of FIG. 22.

As described above, in accordance with embodiments of the present invention, according to the first to third examples, even in the case that the position-adjustment heating element 21 is provided, variation in fly height of the combined reading and writing elements 30 due to heating of the heating element may be compensated.

While embodiments of the present invention have been illustrated by the above-described examples, embodiments of the invention are not limited to the above-described examples, and various modifications or alterations may be performed within the spirit and scope of embodiments of the present invention.

Figure 30:
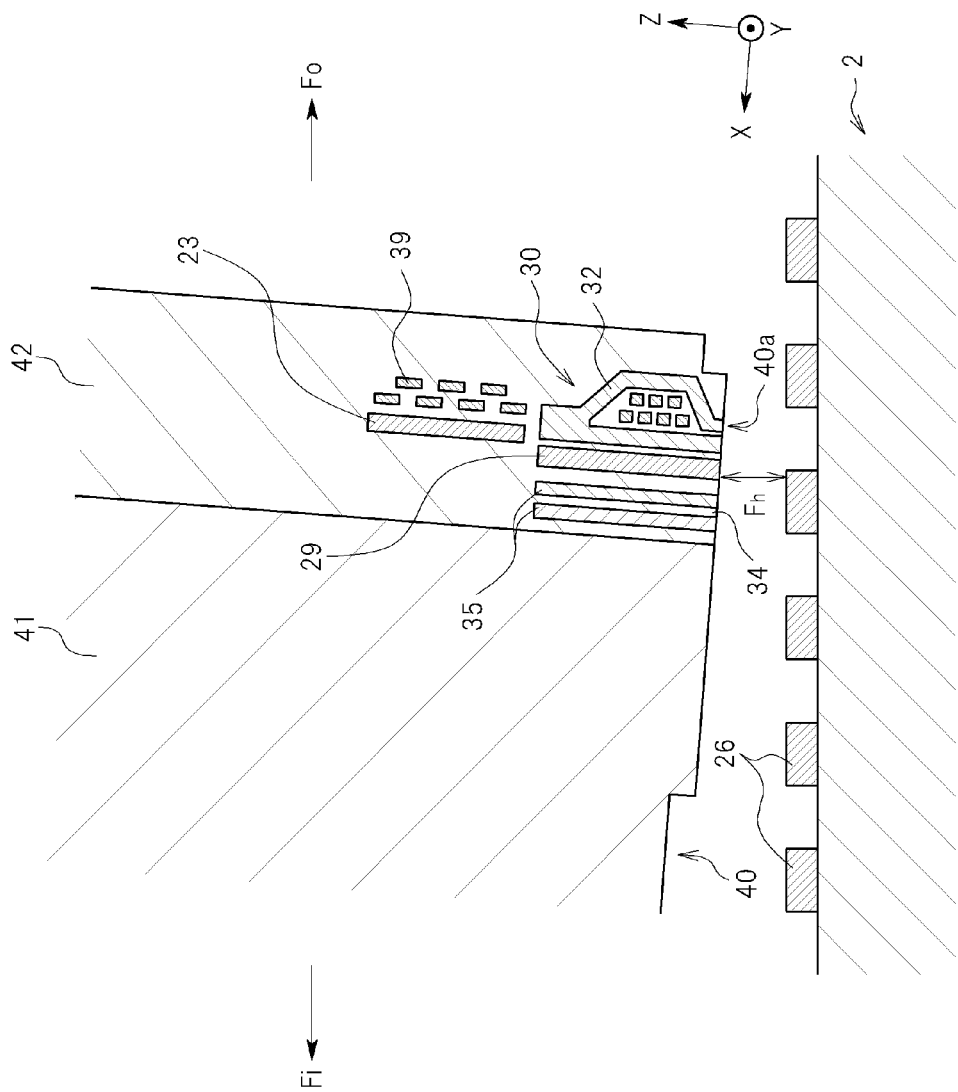
FIG. 30 is an example diagram showing a modification of the head-slider, in accordance with an embodiment of the present invention.

For example, as shown in FIG. 30, in another embodiment of the present invention, the head-slider 4 may be designed such that a position-adjustment heating element 29 is disposed on one side or both sides in a longitudinal direction with respect to a write element 32. In this modification, the position-adjustment heating element 29 is disposed between the write element 32 and a read element 34. The position-adjustment heating element 29 causes thermal expansion of an alumina portion existing between the position-adjustment heating element 29 and the write element 32, so that the write element 32 is displaced to one side in the longitudinal direction. Therefore, in the modification, the write element 32 may be displaced along a track-length direction of a track of the magnetic-recording disk 2. Such a technique is particularly useful for bit-patterned media in which a track is configured of a plurality of magnetic bit-cells 26 that are isolated magnetically from one another.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A hard-disk drive, comprising:
   a head-slider configured to fly in proximity with a recording surface of a magnetic-recording disk, said head-slider comprising:
      a write element configured to write data to said magnetic-recording disk,
      a fly-height-adjustment heating element configured to displace said write element towards said magnetic-recording disk, and
      a position-adjustment heating element configured to displace said write element in at least a direction perpendicular to a flying direction;
   a fly-height variation compensator configured to generate a signal for compensating variation in fly height of said write element, and configured to add said signal to a control signal for output to said fly-height-adjustment heating element, wherein said fly-height variation compensator is configured to generate a signal for compensating said variation in fly height based on said control signal for output to said position-adjustment heating element;
   a fly-height variation detector configured to detect said variation in fly height, and configured to output a detection signal; and
   a second fly-height variation compensator configured to generate a second signal for compensating said variation in fly height based on said detection signal, and configured to add said second signal to said control signal for output to said fly-height-adjustment heating element.

2. The hard-disk drive of claim 1, wherein said fly-height variation compensator is configured to generate a signal for compensating said variation in fly height due to heating of said position-adjustment heating element.

3. The hard-disk drive of claim 1, further comprising:
   a fly-height variation detector configured to detect said variation in fly height, and configured to output a detection signal;
   wherein said fly-height variation compensator is configured to generate a signal for compensating said variation in fly height based on said detection signal.

4. The hard-disk drive of claim 1, wherein said position-adjustment heating element is disposed away from said write element in at least a width direction of said head-slider.

5. The hard-disk drive of claim 1, wherein said position-adjustment heating element is disposed away from said write element in at least a longitudinal direction of said head-slider.

6. A method of controlling fly height in a hard-disk drive comprising a head-slider configured to fly in proximity with a recording surface of a magnetic-recording disk, said method comprising:
   generating a signal for compensating a variation in fly height of a write element of said head-slider, and
   adding said signal to a control signal for output to a fly-height-adjustment heating element of said head-slider;
   wherein said head-slider comprises:
      said write element configured to write data to said magnetic-recording disk,
      said fly-height-adjustment heating element configured to displace said write element towards said magnetic-recording disk,
      a position-adjustment heating element configured to displace said write element in at least a direction perpendicular to a flying direction;
   detecting said variation in fly height,
   outputting a detection signal,
   generating a second signal for compensating said variation in fly height based on said detection signal, and
   adding said second signal to said control signal for output to said fly-height-adjustment heating element.

7. The method of claim 6, further comprising:
   generating a signal for compensating said variation in fly height due to heating of said position-adjustment heating element.

8. The method of claim 6, further comprising:
   generating a signal for compensating said variation in fly height based on said control signal for output to said position-adjustment heating element.

9. The method of claim 6, further comprising:
   detecting said variation in fly height,
   outputting a detection signal, and
   generating a signal for compensating said variation in fly height based on said detection signal.

* * * * *